United States Patent
Ishikawa et al.

(10) Patent No.: US 8,504,184 B2
(45) Date of Patent: Aug. 6, 2013

(54) COMBINATION DEVICE, TELECOMMUNICATION SYSTEM, AND COMBINING METHOD

(75) Inventors: Tomokazu Ishikawa, Osaka (JP); Takeshi Norimatsu, Hyogo (JP); Huan Zhou, Singapore (SG); Zhong Hai Shan, Singapore (SG); Kok Seng Chong, Singapore (SG)

(73) Assignee: Panasonic Corporation, Osaka (JP)

( * ) Notice: Subject to any disclaimer, the term of this patent is extended or adjusted under 35 U.S.C. 154(b) by 393 days.

(21) Appl. No.: 12/935,797

(22) PCT Filed: Feb. 4, 2010

(86) PCT No.: PCT/JP2010/000666
§ 371 (c)(1),
(2), (4) Date: Sep. 30, 2010

(87) PCT Pub. No.: WO2010/090019
PCT Pub. Date: Aug. 12, 2010

(65) Prior Publication Data
US 2011/0029113 A1 Feb. 3, 2011

(30) Foreign Application Priority Data
Feb. 4, 2009 (JP) ................................. 2009-024304

(51) Int. Cl.
*G06F 17/00* (2006.01)
(52) U.S. Cl.
USPC .............................. 700/94; 704/500; 704/501
(58) Field of Classification Search
USPC ......................................................... 700/94
See application file for complete search history.

(56) References Cited

U.S. PATENT DOCUMENTS

| 6,128,649 | A | 10/2000 | Smith et al. |
| 6,728,222 | B1 | 4/2004 | Ono |
| 6,934,906 | B1 * | 8/2005 | Cheok .......................... 715/204 |
| 8,255,206 | B2 | 8/2012 | Ito et al. |
| 2004/0054689 | A1 * | 3/2004 | Salmonsen et al. ........ 707/104.1 |
| 2006/0174267 | A1 * | 8/2006 | Schmidt .......................... 725/39 |

(Continued)

FOREIGN PATENT DOCUMENTS

| CN | 101258539 | 9/2008 |
| JP | 2000-174909 | 6/2000 |

(Continued)

OTHER PUBLICATIONS

ID3 draft specification; Copyright Nov. 1, 2000.*

(Continued)

*Primary Examiner* — Paul McCord
(74) *Attorney, Agent, or Firm* — Wenderoth, Lind & Ponack, L.L.P.

(57) ABSTRACT

A combination device (305) according to the present invention includes: a detection unit (501) that detects active coded bitstreams that are effective coded bitstreams from a plurality of coded bitstreams (116) within a predetermined time period; a first combining unit (504) that combines, from a plurality of downmix sub-streams (115) included in the coded bitstreams (116), only downmix sub-streams (115) included in the active coded bitstreams so as to generate a combined downmix sub-stream (121); and a second combining unit (506) that combines, from a plurality of parameter sub-streams (113) included in the coded bitstreams (116), only parameter sub-streams (113) included In the active coded bitstreams so as to generate a combined parameter sub-stream (122).

21 Claims, 28 Drawing Sheets

(56) References Cited

U.S. PATENT DOCUMENTS

| | | | |
|---|---|---|---|
| 2006/0195314 A1* | 8/2006 | Taleb et al. | 704/200.1 |
| 2008/0008323 A1 | 1/2008 | Hilpert et al. | |
| 2008/0140426 A1* | 6/2008 | Kim et al. | 704/500 |
| 2008/0262850 A1 | 10/2008 | Taleb et al. | |
| 2009/0129576 A1 | 5/2009 | Yamanashi et al. | |
| 2009/0157411 A1 | 6/2009 | Kim et al. | |
| 2009/0164221 A1 | 6/2009 | Kim et al. | |
| 2009/0164222 A1 | 6/2009 | Kim et al. | |
| 2009/0248402 A1 | 10/2009 | Ito et al. | |
| 2009/0326958 A1* | 12/2009 | Kim et al. | 704/500 |
| 2010/0092008 A1* | 4/2010 | Oh et al. | 381/119 |
| 2010/0145487 A1* | 6/2010 | Oh et al. | 700/94 |
| 2010/0198990 A1* | 8/2010 | Shimada et al. | 709/246 |
| 2011/0013790 A1* | 1/2011 | Hilpert et al. | 381/300 |
| 2011/0112843 A1* | 5/2011 | Shimada et al. | 704/500 |

FOREIGN PATENT DOCUMENTS

| | | |
|---|---|---|
| JP | 2002-501710 | 1/2002 |
| JP | 2007-25375 | 2/2007 |
| JP | 2007-228506 | 9/2007 |
| WO | 2006/091139 | 8/2006 |
| WO | 2008/026754 | 3/2008 |
| WO | 2008/039039 | 4/2008 |
| WO | 2008/044901 | 4/2008 |
| WO | 2008/046530 | 4/2008 |
| WO | 2008/100099 | 8/2008 |
| WO | 2008/150141 | 12/2008 |
| WO | 2009/001887 | 12/2008 |

OTHER PUBLICATIONS

International Search Report issued Mar. 26, 2010 in International (PCT) Application No. PCT/JP2010/000666.

Shih-Way Huang et al., "*A low complexity design of psycho-acoustic model for MPEG-2/4 advanced audio coding*", IEEE Transactions on Consumer Electronics, vol. 50, No. 4, Nov. 2004.

Tsung-Han Tsai et al., "*An MDCT-based psychoacoustic model co-processor design for MPEG-2/4 AAC audio encoder*", Proc. of the $7^{th}$ Int. Conference on digital audio effects, Oct. 2004.

Ivan Dimkoviae et al., "*Fast software implementation of MPEG advanced audio encoder*", $14^{th}$ Int. Conference on DSP, 2002.

Kundan Singh et al., "Centralized Conferencing using SIP", Proc. of the $2^{nd}$ SIP—Telephony Workshop, Apr. 2001.

* cited by examiner

FIG. 12

| | The Number $N_1$ of Active Sites | The Number of Partial Decoding Processes | The Number of Combining Processes | The Number of Partial Coding Processes |
|---|---|---|---|---|
| MCU of Present Invention | 1 | 0 | 0 | 0 |
| | 2 | 2 | 1 | 1 |
| | >2 | $N_1$ | $N_1$ or $(N_1+1)$ | $N_1$ or $(N_1+1)$ |
| General MCU | $N_1$ | N | N | N |

FIG. 20

| | The Number $N_1$ of Active Sites | The Number of Partial Decoding Processes | The Number of Combining Processes | The Number of Partial Coding Processes |
|---|---|---|---|---|
| MCU of Present Invention (First Embodiment) | 1 | 0 | 0 | 0 |
| | 2 | 2 | 1 | 1 |
| | >2 | $N_1$ | $N_1$ or $(N_1+1)$ | $N_1$ or $(N_1+1)$ |
| MCU of Present Invention (Second Embodiment) | >2 | $N_1$ | 1 | 1 |
| General MCU | $N_1$ | N | N | N |

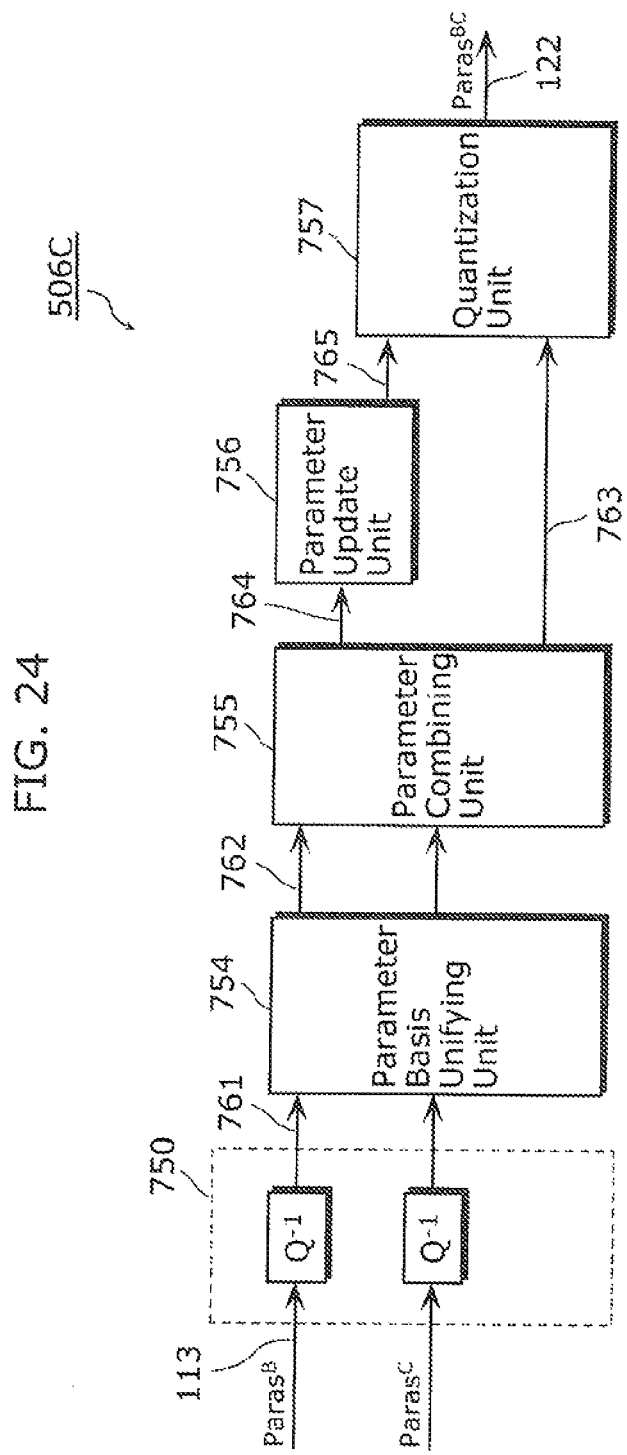

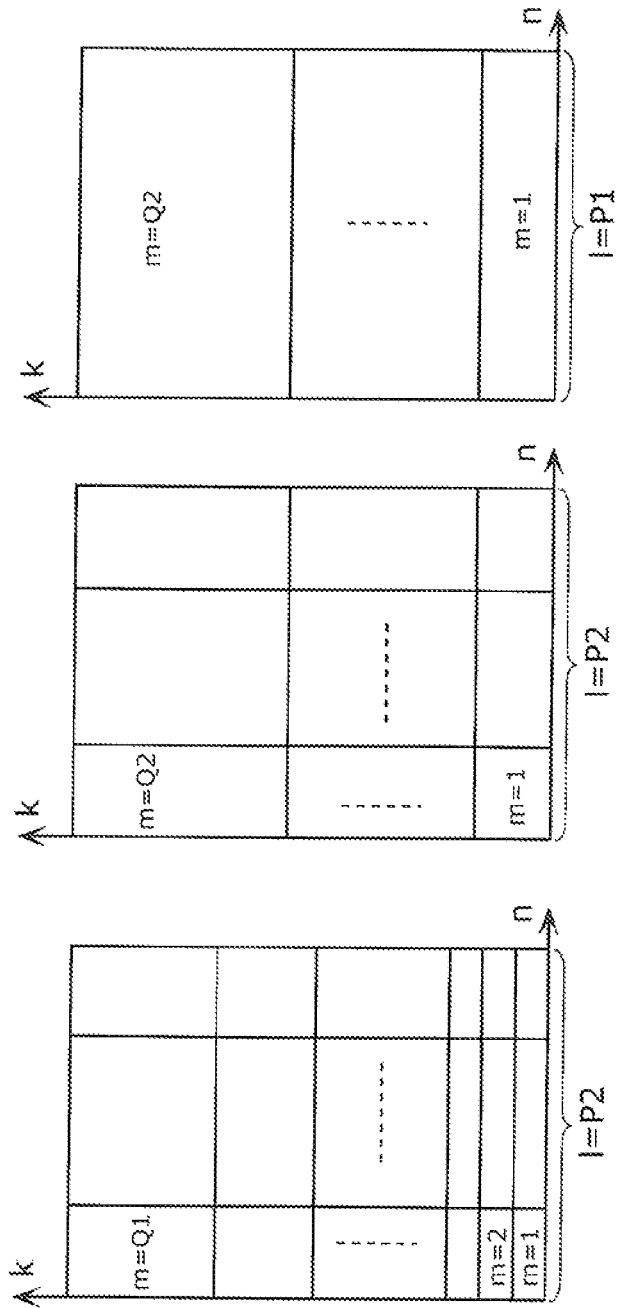

COMBINATION DEVICE, TELECOMMUNICATION SYSTEM, AND COMBINING METHOD

TECHNICAL FIELD

The present invention relates to combination devices, telecommunication systems, and combining methods. More particularly, the present invention relates to a combination device to combine a plurality of coded bitstreams transmitted from a plurality of sites into a single bitstream. Each of the coded bitstreams includes: a downmix sub-stream in which a plurality of input audio signals are down-mixed; and a parameter sub-stream to be used to reconstruct the downmix sub-stream into the plurality of input audio signals.

BACKGROUND ART

The recent development on parametric coding technology is very active in the audio coding area because of its advantages of high coding efficiency and sound image reproduction. Compared to the traditional waveform coding schemes, parametric coding scheme not only exploits the limitations of the human auditory system, but also attempts to model the incoming audio signal by capturing the sound scene characteristics. One example of known arts in this technical field is a coding method related to a parametric stereo and MPEG surround.

A typical parametric coding device 100 is shown in FIG. 1. The parametric coding device 100 shown in FIG. 1 includes a time-frequency (T-F) transform unit 101, an analyzer 102, a frequency-time (F-T) transform unit 103, and a downmix encoder 104.

The T-F transform unit 101 transforms a plurality of input audio signals 110, which are time signals, into a plurality of frequency signals 111.

The analyzer 102 analyzes the resulting frequency signals 111 in two ways. The analyzer 102 includes a downmix unit 102A and a parameter extraction unit 102B.

The downmix unit 102A generates a mono- or stereo-intermediate downmix signal 112 from the frequency signals 111. The parameter extraction unit 102B extracts parameters from the frequency signals 111 to generate a parameter sub-stream 113 including the extracted parameters.

The F-T transform unit 103 transforms the intermediate downmix signals 112 back to time domain to generate downmix time signals 114.

The downmix encoder 104 compresses the downmix time signals 114 to generate a downmix sub-stream 115 including the compressed signal.

Finally, the parametrically coded audio stream is composed of a downmix sub-stream 115 and an associated parameter sub-stream 113.

Note that in practice, the above two sub-streams are multiplexed into one audio stream. But for clarity of the later description, description of the multiplexing operation in the encoder and the de-multiplexing operation in the decoder is omitted in this description.

A typical parametric decoding device 200 is shown in FIG. 2. The parametric decoding device 200 includes a downmix decoder 201, a T-F transform unit 202, a parameter synthesis unit 203, and a F-T transform unit 204.

The downmix decoder 201 decodes the received downmix sub-stream 115 into a mono- or stereo-time signal 213.

The T-F transform unit 202 transforms again the time signal 213 into parametric analysis domain to generate frequency signal 214.

The parameter synthesis unit 203 synthesizes the frequency signals 214 into a plurality of transformed signals 215, guided by the information derived from the received parameter sub-stream 113.

The F-T transform unit 204 transforms the transformed signals 215 back to the time domain resulting in a plurality of output audio signals 216, which perceptually represent the same spatial sound images as the input one.

The above coding procedures show two features of a parametric encoder: high coding efficiency, which comes from the reduced transmitting channel number; and realistic acoustic scene reconstruction, which is realized by the synthesis of the spatial relevant parameters.

Because of these two features, a parametric encoder is highly preferred to be adopted in telecommunication systems, where each communication site may have a plurality of input audio signals 110 from a plurality of speakers, and a realistic tele-presence effect is usually expected.

FIG. 3 is a diagram showing a telecommunication system 300 performed among four teleconferencing sites 301A to 301D. If it is not necessary to especially distinguish the sites 301A to 301D from each other, each of them is referred to as a site 301.

At each site 301 (site 301A, for example), a parametric codec is adopted. The site 301 performs parametric coding for all of received input audio signals 110 to generate a coded bitstream 116 (including a downmix sub-stream $Dmx^A$ and a parameter sub-stream $Paras^A$). The generated coded bitstream 116 is transmitted to each of the other three sites 301B to 301D.

Meanwhile, the site 301 receives coded bitstreams 116 from the other sites 301 and performs parametric decoding for each of the received coded bitstreams 116. (Here, the received coded bitstreams 116 include three downmix sub-streams $Dmx^B$, $Dmx^C$, and $Dmx^D$ and three parameter sub-streams $Paras^B$, $Paras^C$, and $Paras^D$).

However, generally, to fulfill the requirement of the set-up and to keep the transmission bandwidth reasonably low, directly transmitting a plurality of coded bitstreams 116 from a plurality of transmission sites to one receiving site is not feasible. In order to assure that each site 301 only receives and sends one audio stream, a combination device (multipoint control unit: MCU 305) is introduced, which is connected with all sites 301A to 301D.

The object of the MCU 305 is, for each site 301, to combines a plurality of received coded bitstreams 116 into a single combined bitstream 124 in a computationally efficient way. Ideally, the combined bitstream 124 should be approximated to the one that could be obtained by coding a single virtual site, wherein all coded bitstreams 116 from the other sites 301 are presented.

For this purpose, a straightforward combining scheme can be designed, as shown in FIG. 4. FIG. 4 is a block diagram showing a functional structure of the MCU 305. As shown in FIG. 4, the MCU 305 includes three individual parametric decoders 401 to 403, an adder (adding unit) 404, and a parametric encoder 405.

The three parametric decoders 401 to 403 decode all coded bitstreams 116 which the site 301 (site 301A, for example) receives from the other sites 301 (sites 301B, 301C, and 301D) in order to generate decoded signals 411B, 411C, and 411D in a time domain.

The adder 404 sums the generated decoded signals 411B, 411C, and 411D to generate a sum signal 412.

The parametric encoder 405 re-codes the sum signal 412 to generate a combined bitstream 124.

Even within this simple scenario, it can be seen that for an N-site telecommunication system, such MCU 305 needs N individual tandem parametric decoding and coding processes. As a result, the complexity of the MCU 305 is increased, which increases a delay amount of signal transmission. The complexity is linearly increased with the increase of the number of sites. Therefore, the MCU 305 is unfeasible for real-time application scenarios.

To design the low latency and low complexity MCU 305, it needs to explore further advantage of the parametric coding. That is, its audio stream format of the parametric coding supports the ability to combine two or more streams into a single signal stream in a computationally efficient way. In detail, the audio stream format of the parametric coding allows downmix sub-streams to be combined in the downmix coding domain, and the parameter sub-streams to be combined in the parameter analysis domain.

The state of the art suggests some similar methods to deal with the efficient MCU design.

For example, Patent Reference 1 proposed a scheme to efficiently combine a plurality of parametrically encoded audio signals. However, in Patent Reference 1, to pursue simplicity, the downmix combination and parameter combination are independent. Moreover, the downmix combination scheme therein only shows a partial scheme using very coarse combination methods. And the parameter combination scheme therein does not address the problem of different parameter analyzing domains.

[Prior Art]
[Patent References]
[Patent Reference 1] US Patent Application Publication No. 2008/0008323, Specification
Non-Patent References
[Non-Patent Reference 1] S.-W. Huang et al, "A low complexity design of psycho-acoustic model for MPEG-2/4 advanced audio coding", IEEE Trans. on consumer electronics, November 2004
[Non-Patent Reference 2] T-H Tsai et al, "An MDCT-based psychoacoustic model co-processor design for MPEG-2/4 AAC audio encoder", Proc. Of the 7th Int. Conference on digital audio effects, 2004
[Non-Patent Reference 3] I. Dimkoviae et al, "Fast software implementation of MPEG advanced audio encoder", 14th Int. Conference on DSP, 2002

SUMMARY OF THE INVENTION

Problems that Invention is to Solve

The parametric audio coding method is preferred in a realistic communication system because of its high coding efficiency and sound scene reconstruction features. To enable the scenario, one practical problem needs to be tackled, i.e., how to combine a plurality of parametrically encoded audio streams into a single stream with low complexity.

In order to solve the above problem, an object of the present invention is to provide a combination device capable of reducing complexity.

Means to Solve the Problems

In accordance with an aspect of the present invention for achieving the object, there is provided a combination device that combines a plurality of coded bitstreams transmitted from a plurality of sites, the plurality of coded bitstreams each including a downmix sub-stream and a parameter sub-stream, the downmix sub-stream being generated by down-mixing a plurality of input audio signals, and the parameter sub-stream being to be used to reconstruct the plurality of input audio signals from the downmix sub-stream, the combination device including: a detection unit configured to detect an active coded bitstream from the plurality of coded bitstreams within a predetermined time period, the active coded bitstream being a coded bitstream that is effective; a first combining unit configured to combine, from among a plurality of downmix sub-streams, only plural downmix sub-streams included in plural active coded bitstreams, so as to generate a combined downmix sub-stream; a second combining unit configured to combine, from among a plurality of parameter sub-streams, only plural parameter sub-streams included in the plural active coded bitstreams, so as to generate a combined parameter sub-stream; and a transmission unit configured to transmit, to the plurality of sites, a combined bit stream that includes the combined downmix sub-stream and the combined parameter sub-stream.

With the above structure, the combination device according to the aspect of the present invention does not combine coded bitstreams received from inactive sites. As described above, the combination device according to the aspect of the present invention determines whether or not each of the sites is active, thereby reducing complexity.

It is possible that the first combining unit includes: a decoding unit configured to decode, from among the plurality of downmix sub-streams, only the plural downmix sub-streams included in the plural active coded bitstreams, so as to generate plural decoded downmix sub-streams; an adding unit configured to add the plural decoded downmix sub-streams together so as to generate at least one intermediate combined downmix sub-stream; and a coding unit configured to code the at least one intermediate combined downmix sub-stream so as to generate at least one combined downmix sub-stream.

With the above structure, the combination device according to the aspect of the present invention does not decode a coded bitstream received from any inactive site. Thereby, the combination device according to the aspect of the present invention can reduce complexity.

It is also possible that the first combining unit is configured to combine, for each of the plurality of sites, downmix sub-streams transmitted from the plurality of sites except the each of the plurality of sites, from among the plural downmix sub-streams included in the plural active coded bitstreams, so as to generate a combined downmix sub-stream to be transmitted to the each of the plurality of sites, the second combining unit is configured to combine, for each of the plurality of sites, parameter sub-streams transmitted from the plurality of sites except the each of the plurality of sites, from among the plural parameter sub-streams included in the plural active coded bitstreams, so as to generate a combined parameter sub-stream to be transmitted to the each of the plurality of sites, the transmission unit is configured to transmit, to the each of the plurality of sites, a combined bitstream that includes the combined downmix sub-stream and the combined parameter sub-stream, and when a number of inactive coded bitstreams is two or more, the inactive coded bitstreams being coded bitstreams other than the plurality of active coded bitstreams in the plurality of coded bitstreams, (1) the first combining unit is configured to combine the plural downmix sub-streams included in all of the plural active coded bitstreams so as to generate a common combined downmix sub-stream, (2) the second combining unit is configured to combine the plural parameter sub-streams included all of the plural active coded bitstreams so as to generate a common combined parameter sub-stream, and (3) the transmission unit is configured to transmit a common combined bitstream that includes the common combined downmix sub-stream and the common combined parameter sub-stream, to sites which transmit the inactive coded bitstreams that are two or more.

With the above structure, when there are a plurality of inactive sites, the combination device according to the aspect of the present invention transmits a common combined bitstream to each of the plurality of inactive sites. Thereby, the combination device according to the aspect of the present invention can reduce the number of combining processes so as to reduce complexity.

It is further possible that when a number of the plural active coded bitstreams is two, the transmission unit is configured to (i) transmit, without a combining process, a first coded bitstream that is one of the plural active coded bitstreams to a site transmitting a second coded bitstream that is other one of the plural active coded bitstreams, and to (ii) transmit the second coded bitstream to a site transmitting the first coded bitstream without a combining process.

With the above structure, when there are two active sites, the combination device according to the aspect of the present invention transmits a bitstream received from one active site to the other active site without a combining process. Thereby, the combination device according to the aspect of the present invention can reduce the number of combining processes so as to reduce complexity.

It is still further possible that when a number of the plural active coded bitstreams is one, the transmission unit is configured to transmit, without a combining process, the active coded bitstream to the plurality of sites except a site transmitting the active coded bitstream.

With the above structure, when there is one active site, the combination device according to the aspect of the present invention transmits a bitstream received from the active site to the other sites without a combining process. Thereby, the combination device according to the aspect of the present invention can reduce the number of combining processes so as to reduce complexity.

It is still further possible that the detection unit is configured to detect the active coded bitstream based on information included in each of the plurality of parameter sub-streams.

With the above structure, the combination device according to the aspect of the present invention can easily detect a coded bitstream transmitted from an active site (an active coded bitstream), based on information included in the parameter stream.

It is still further possible that the first combining unit is configured to combine the plural downmix sub-streams included in all of the plural active coded bitstreams so as to generate a single combined downmix sub-stream, the second combining unit is configured to combine the plural parameter sub-streams included in all of the plural active coded bitstreams so as to generate a single combined parameter sub-stream, and the transmission unit is configured to transmit, to each of the plurality of sites, a single combined bitstream that includes the single combined downmix sub-stream and the single combined parameter sub-stream.

With the above structure, the combination device according to the aspect of the present invention generates a single combined bitstream common in all sites. Thereby, the combination device according to the aspect of the present invention can reduce the number of combining processes so as to reduce complexity.

It is still further possible that the combination device further includes an additional information generation unit configured to generate, for each of active sites which have transmitted the plural active coded bitstreams, additional information to be used to specify a signal component from signal components in the single combined bitstream, the signal component corresponding a corresponding one of the plural active coded bitstreams which has been transmitted from the each of active sites, wherein the transmission unit is configured to transmit the additional information to the each of active sites.

With the above structure, each of the sites can remove, from the signal components in the single combined bitstream, signal components of a coded bitstream transmitted from the site itself, based on the additional information transmitted from the combination device according to the aspect of the present invention.

It is still further possible that the additional information generation unit is configured to generate the additional information for each of the active sites, the additional information being to be used to specify a parameter from parameters included in the single combined parameter sub-stream, the parameter corresponding to a corresponding one of the plural parameter sub-streams which has been transmitted from the each of the active sites.

With the above structure, each of the sites can remove, from the signal components in the single combined bitstream, signal components of a coded bitstream transmitted from the site itself, by updating parameters based on the additional information transmitted from the combination device according to the aspect of the present invention.

It is still further possible that the second combining unit includes a parameter basis unifying unit configured to convert different parameter presentation bases of the plural parameter sub-streams to a single unified parameter presentation basis, and generate plural unified parameters based on the single unified parameter presentation basis, when the plural parameter sub-streams are expressed by the different parameter presentation bases, and the second combining unit is configured to combine the plural unified parameters so as to generate the combined parameter sub-stream.

With the above structure, the combination device according to the aspect of the present invention can efficiently generate a combined parameter sub-stream even if a plurality of parameter sub-streams to be combined together are expressed by different parameter presentation bases.

It is still further possible that the combination device further includes a parameter basis selection unit configured to select the single unified parameter presentation basis from a plurality of parameter presentation bases, based on a current bit rate available for transmission from the combination device to the plurality of sites.

With the above structure, by considering a bit rate, the combination device according to the aspect of the present invention can efficiently unify parameter sub-streams having different parameter presentation bases.

It is still further possible that the combination device further includes a parameter basis selection unit configured to select the single unified parameter presentation basis from a plurality of parameter presentation bases, based on a bit cost indicating the number of bits of the combined parameter sub-stream.

With the above structure, by considering a bit cost, the combination device according to the aspect of the present invention can efficiently unify parameter sub-streams having different parameter presentation bases.

It is still further possible that each of the plural downmix sub-stream is generated by down-mixing the plurality of input audio signals, transformed into a spectrum domain, and coded, the decoding unit is configured to decode the plural downmix sub-streams to generate the plural decoded downmix sub-streams in the spectrum domain, and the adding unit is configured to add the plural decoded downmix sub-streams in the spectrum domain together so as to generate the at least one intermediate combined downmix sub-stream.

With the above structure, the combination device according to the aspect of the present invention does not decode coded bitstreams in a time domain. In other words, the combination device according to the aspect of the present invention does not perform time-frequency transform and frequency-time transform. Thereby, the combination device according to the aspect of the present invention can reduce complexity.

It is still further possible that the first combining unit further includes a scaling unit configured to scale the at least one intermediate combined downmix sub-stream so that spectrum power of the plural decoded downmix sub-streams is preserved in the at least one intermediate combined downmix sub-stream, and the coding unit is configured to code the at least one intermediate combined downmix sub-stream scaled by the scaling unit so as to generate the combined downmix sub-stream.

With the above structure, the combination device according to the aspect of the present invention can be preserved, in an intermediate combined downmix sub-stream, spectrum power of a plurality of decoded downmix sub-streams.

It is still further possible that the second combining unit includes: an inverse quantization unit configured to inversely quantize the plural parameter sub-streams so as to generate plural inversely-quantized parameters; a parameter combining unit configured to combine the plural inversely-quantized parameters so as to generate a combined parameter; a parameter update unit configured to update a part of parameters included in the combined parameter so as to generate a updated parameter; and a quantization unit configured to quantize (a) a parameter except the part of parameters included in the combined parameter and (b) the updated parameter so as to generate the combined parameter sub-stream.

With the above structure, the combination device according to the aspect of the present invention combines and updates a part of parameters in a parametric analysis domain. Thereby, in the combination device according to the aspect of the present invention, the parameters can conform with the combining method of combining downmix sub-streams.

In accordance with another aspect of the present invention for achieving the object, there is provided a telecommunication system including: a plurality of sites each including a coding device that generates a coded bitstream that includes a downmix sub-stream and a parameter sub-stream, the downmix sub-stream being generated by down-mixing a plurality of input audio signals, and the parameter sub-stream being to be used to reconstruct the plurality of input audio signals from the downmix sub-stream; and the combination device according to claim 1 which combines a plurality coded bitstreams including the coded bitstream which are transmitted from the plurality of sites so as to generate a combined bitstream, and transmits the combined bitstream to each of the plurality of sites, wherein each of the plurality of sites further includes a decoding device that decodes the combined bitstream to generate output audio signals.

With the above structure, the telecommunication system according to another aspect of the present invention does not combine coded bitstreams received from inactive sites. Thereby, the telecommunication system according to another aspect of the present invention can reduce complexity (computing amount) of the combination device.

In accordance with another aspect of the present invention for achieving the object, there is provided a telecommunication system including: a plurality of sites each including a coding device that generates a coded bitstream that includes a downmix sub-stream and a parameter sub-stream, the downmix sub-stream being generated by down-mixing a plurality of input audio signals, and the parameter sub-stream being to be used to reconstruct the plurality of input audio signals from the downmix sub-stream; and the combination device according to claim 8 which combines a plurality of coded bitstreams including the coded bitstream which are transmitted from the plurality of sites so as to generate a combined bitstream, and transmits the combined bitstream to each of the plurality of sites, wherein each of the plurality of sites further includes a decoding device that decodes the combined bitstream to generate output audio signals, and the decoding device generates, based on the additional information, the output audio signals from which a signal component is removed from signal components in the single combined bitstream, the signal component corresponding to the coded bitstream transmitted from a corresponding one of the plurality of sites which includes the decoding device.

With the above structure, in the telecommunication system according to another aspect of the present invention, each of the sites can remove, from signal components in a single combined bitstream, signal components of a coded bitstream transmitted from the site itself, based on the additional information transmitted from the combination device.

It should be noted that the present invention can be implemented not only as the combination device and the telecommunication system as described above, but also as: a combining method including steps performed by the characteristic units of the combination device: a program causing a computer to execute the characteristic steps of the combining method; and the like. Of course, the program can be distributed by a recording medium such as a Compact Disc-Read Only Memory (CD-ROM) or by a transmission medium such as the Internet.

Moreover, the present invention can be implemented as a Large Scale Integration (LSI) implementing a part or all of the functions of the combination device or the telecommunication system.

Effects of the Invention

Accordingly, the present invention can provide a combination device that combines a plurality of parametrically encoded audio streams into a single stream at low latency and low complexity. This feature is very attractive for a real-time multi-site communication system, such as a multi-site teleconferencing system.

BRIEF DESCRIPTION OF DRAWINGS

FIG. 12 is a table showing complexity of the MCU according to the first embodiment of the present invention.

FIG. 20 is a table showing complexity of the MCU according to the second embodiment of the present invention.

FIG. 24 is a block diagram of a parameter sub-stream combining unit according to the third embodiment of the present invention.

FIG. 25A is a graph plotting an example of a unified parameter basis according to the third embodiment of the present invention.

FIG. 25B is a graph plotting another example of the unified parameter basis according to the third embodiment of the present invention.

FIG. 25C is a graph plotting still another example of the unified parameter basis according to the third embodiment of the present invention.

DETAILED DESCRIPTION OF THE INVENTION

The following embodiments are merely illustrative for the principles of various inventive steps. It's understood that variations of the details described herein will be apparent to others skilled in the art. It's the intent, therefore, to be limited only by the scope of the patent claims, and not by the specific, illustrative details herein.

In the following, a method using a MCU according to the present invention is described below for a teleconference system (telecommunication system) connecting four sites to each other. MCU for more site teleconferencing scenario can be easily generalized from this case.

Also, the following embodiments are detailed for combination of audio streams that are coded by the prior parametric coding method. And for simplicity, it is assumed downmix signal is a mono signal, which is coded by Advanced Audio Coding (AAC) encoder. These embodiments can be generalized to support other parametrically encoded bitstream format.

(First Embodiment)

Figure 5:
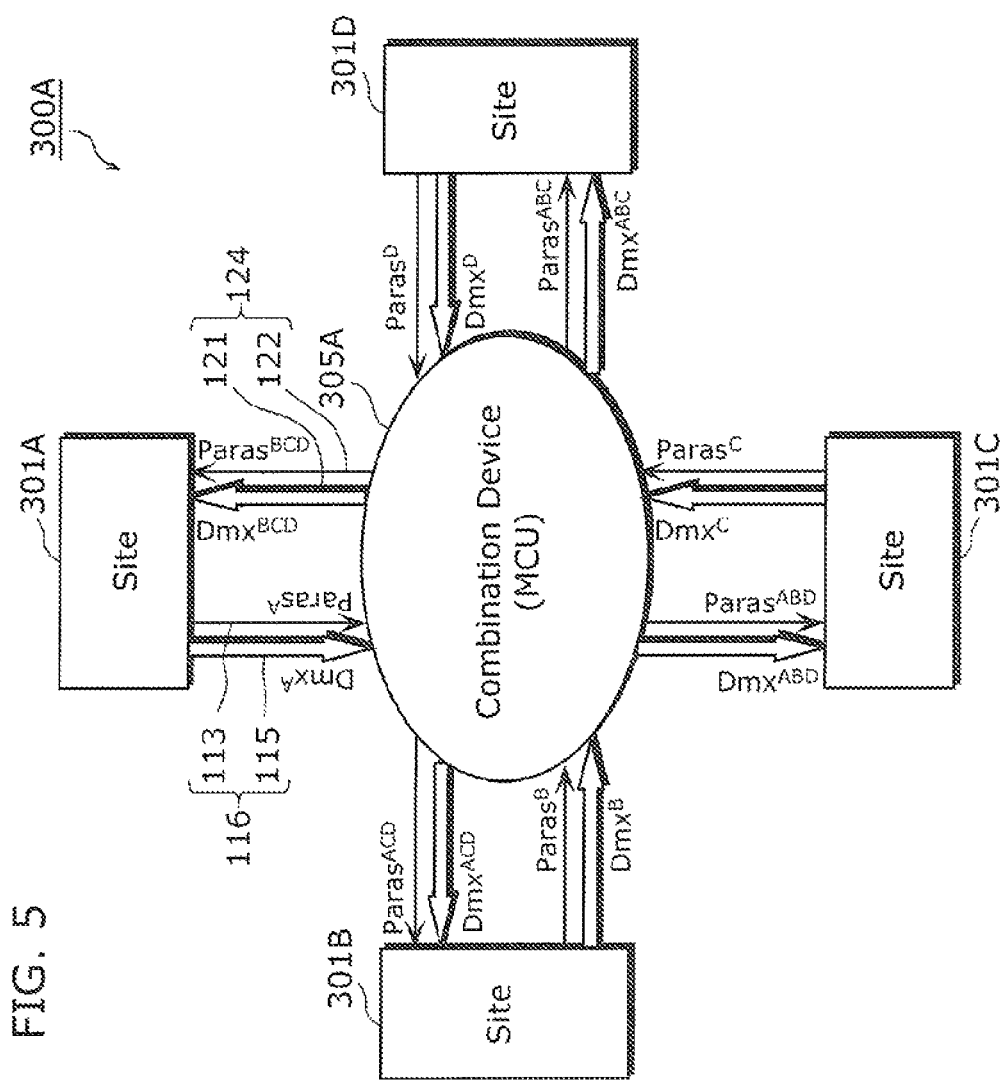
FIG. 5 is a diagram showing a configuration of a telecommunication system according to a first embodiment of the present invention.

FIG. 5 is a diagram showing a configuration of a telecommunication system 300A according to the first embodiment of the present invention.

The telecommunication system 300A is, for example, a teleconference system. The telecommunication system 300A includes four sites 301 (301A to 301D) and a combination device (MCU 305A) that is a multipoint control unit. The four sites 301 are connected to the MCU 305 via a network.

Figure 1:
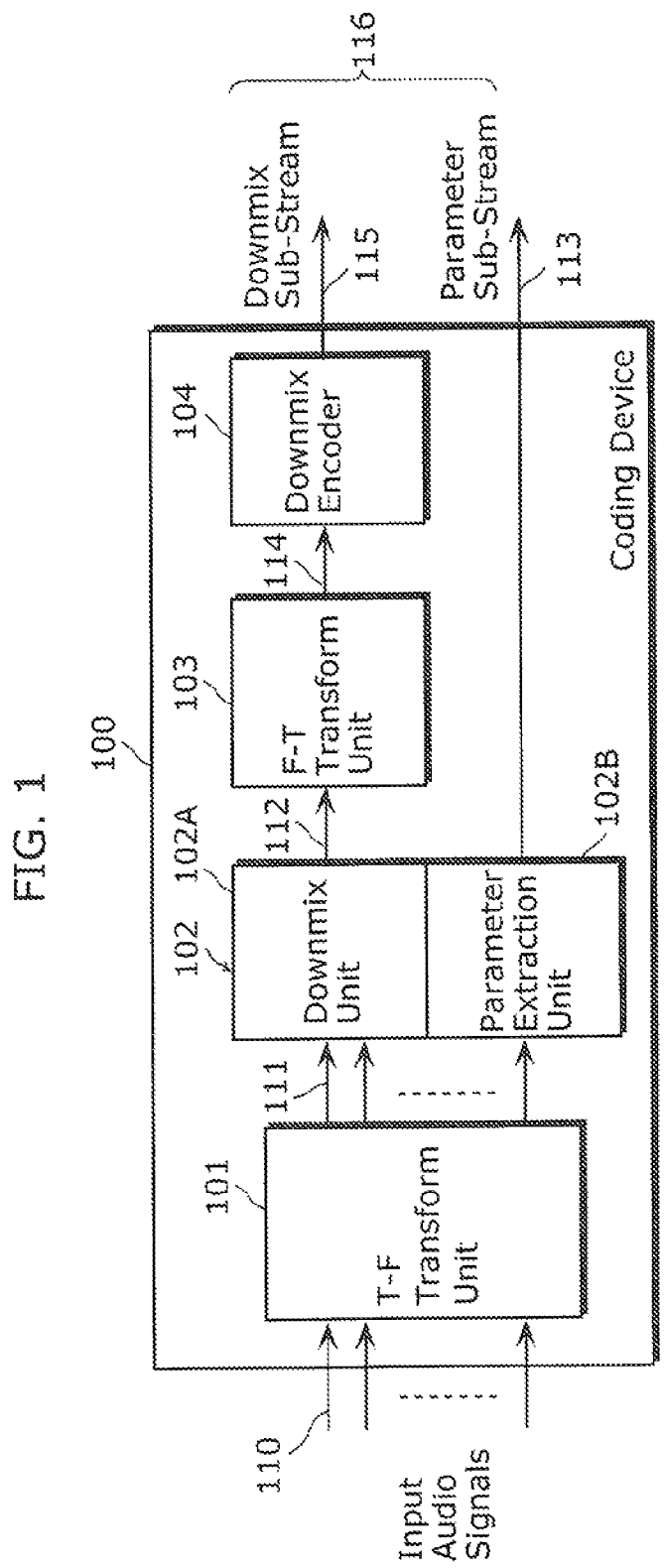
FIG. 1 is a block diagram of a general parametric coding device.
Figure 2:
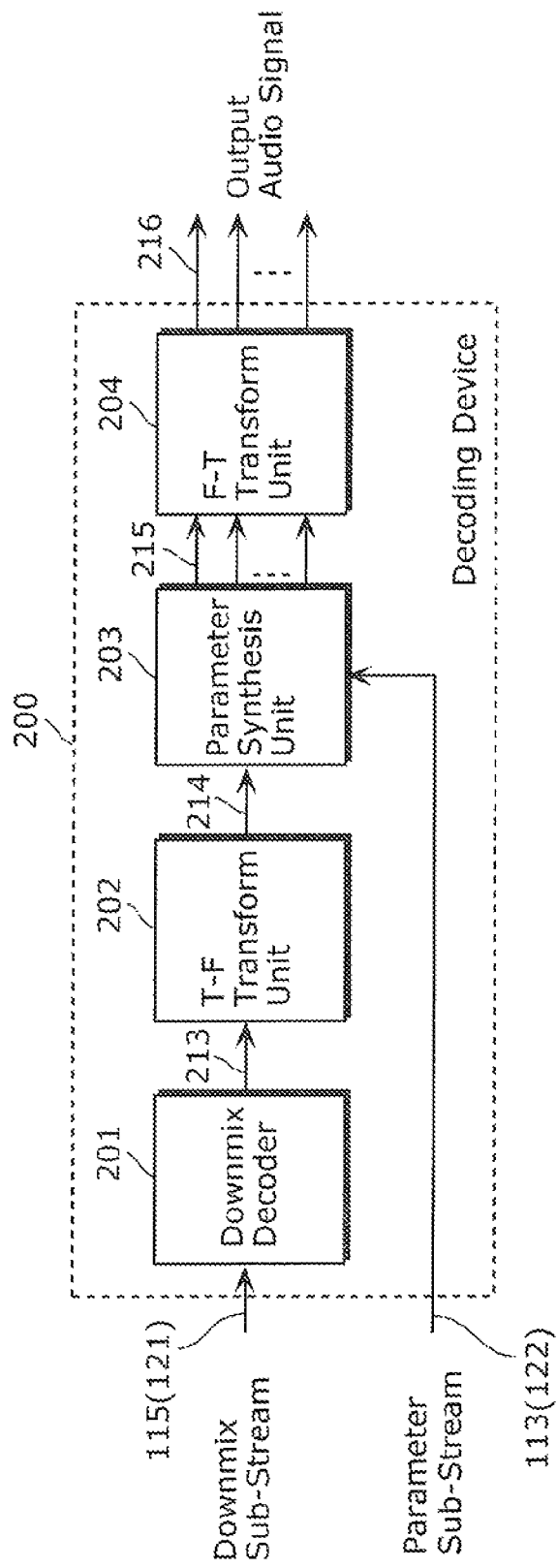
FIG. 2 is a block diagram of a general parametric decoding device.
Figure 3:
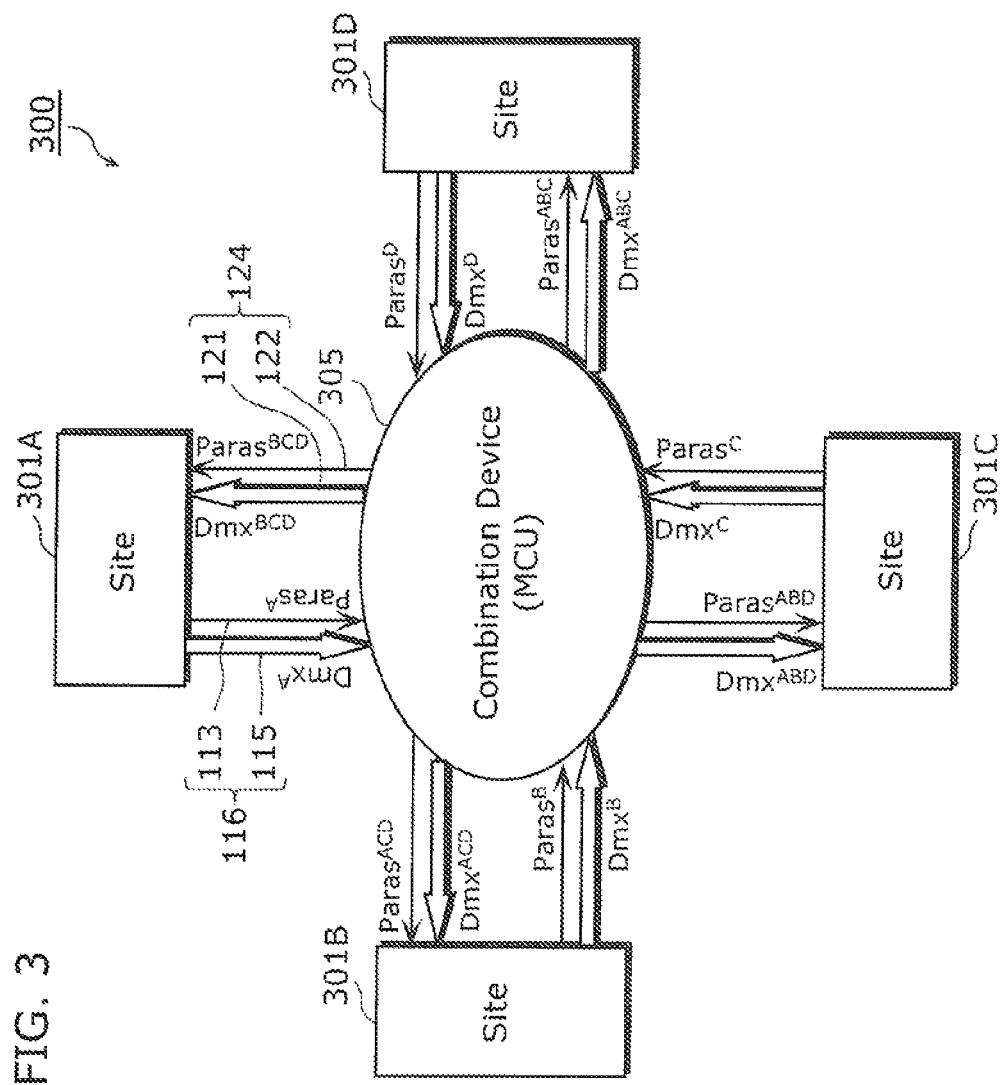
FIG. 3 is a diagram showing a configuration of a conventional telecommunication system.

Each of the sites 301 included the coding device 100 shown in FIG. 1 and the decoding device 200 shown in FIG. 2.

Each coding device 100 performs parametric coding for a plurality of input audio signals 110 obtained by a plurality of microphones connected to the corresponding site 301, thereby generating a coded bitstream 116 that includes a downmix sub-stream 115 and a parameter sub-stream 113. The downmix sub-stream 115 is signal generated by downmixing the plurality of input audio signals 110. The parameter sub-stream 113 is information used to reconstruct the plurality of input audio signals from the downmix sub-stream 115.

Furthermore, each coding device 100 transmits the generated coded bitstream 116 to the MCU 305A.

For example, each of the plurality of input audio signals 110 corresponds to a speech of a corresponding one of a plurality of speakers.

The MCU 305A combines a plurality of the coded bitstreams 116 transmitted from the plurality of sites 301 to generate a combined bitstream 124. The combined bitstream 124 includes a combined downmix sub-stream 121 and a combined parameter sub-stream 122. The MCU 305A transmits the generated combined bitstream 124 to the plurality of sites 301.

In more detail, the MCU 305A generates a combined bitstream 124 for each of the sites 301 (a target site), by combining coded bitstreams 116 transmitted from the sites except the target site. Then, the MCU 305A transmits the generated combined bitstream 124 to the target site 301.

For example, the MCU 305A combines, for the site 301A, coded bitstream 116 transmitted from the sites 301B to 301D to generate a combined bitstream 124 (including a combined downmix sub-stream $Dmx^{BCD}$ and a combined parameter sub-stream $Paras^{BCD}$). Then, the MCU 305 transmits the combined bitstream 124 to the site 301A. For the site 301B, the MCU 305A combines coded bitstream 116 transmitted from the sites 301A, 301C, and 301D to generate a combined downmix sub-stream $\text{Dmx}^{ACD}$ and a combined parameter sub-stream $\text{Paras}^{ACD}$. For the site 301C, the MCU 305A combines coded bitstream 116 transmitted from the sites 301A, 301B, and 301D to generate a combined downmix sub-stream $\text{Dmx}^{ABD}$ and a combined parameter sub-stream $\text{Paras}^{ABD}$. For the site 301D, the MCU 305A combines coded bitstream 116 transmitted from the sites 301A, 301B, and 301C to generate a combined downmix sub-stream $\text{Dmx}^{ABC}$ and a combined parameter sub-stream $\text{Paras}^{ABC}$.

The decoding device 200 in each of the sites 301 decodes the combined bitstream transmitted from the MCU 305A to generate a plurality of output audio signals 216. The plurality of output audio signals 216 are outputted from a plurality of speakers connected to the corresponding site 301.

The coding device 100 shown in FIG. 1 is described in more detail below.

The coding device 100 shown in FIG. 1 performs parametric coding for a plurality of input audio signals 110, thereby generating a coded bitstream 116 that includes a monaural downmix sub-stream 115 and a parameter sub-stream 113.

The coding device 100 includes the T-F transform unit 101, the analyzer 102, the F-T transform unit 103, and the downmix encoder 104.

The T-F transform unit 101 transforms a plurality of input audio signals 110 in a time domain into a plurality of frequency signals 111 in a hybrid domain.

Assuming at the site 301A, $N_A$ audio signals 110 are fed into the parametric coding device 100 receives $N_A$ from the site 301A. The T-F transform unit 101 transforms the $N_A$ input audio signals 110 to $N_A$ frequency signals 111 in a hybrid domain expressed by the following formula 1, with efficient non-uniform frequency resolution.

[Mathematical Expression 1]

$$x_i^{n,k} \text{ (where } i=1, \ldots N_A) \qquad \text{(Formula 1)}$$

where n represents a time slot index indicating a time, and k represents a hybrid band index Indicating a frequency.

The analyzer 102 analyzes the resulting frequency signals 111 using two different methods. The analyzer 102 includes a downmix unit 102A and a parameter extraction unit 102B.

The downmix unit 102A generates a monaural intermediate downmix signal 112 from the plurality of frequency signals 111.

The parameter extraction unit 102B extracts object parameters from the plurality of frequency signals 111. The parameter extraction unit 102B quantizes the extracted object parameters to generate a parameter sub-stream 113.

Figure 6:
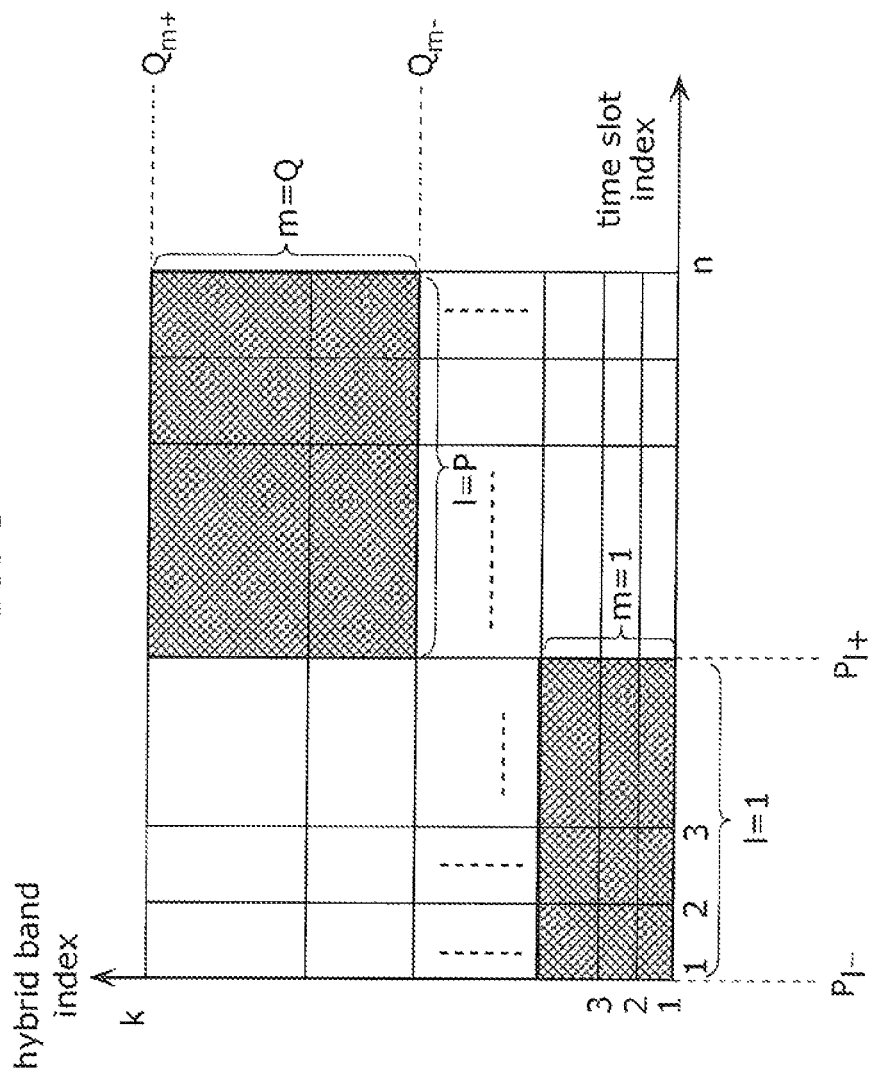
FIG. 6 is a graph plotting a parameter presentation basis in parametric audio coding according to the first embodiment of the present invention.

In more detail, the parameter extraction unit 102B analyzes the object parameters as a function of both time and frequency at a resolution of a time-frequency analysis determined based on psychoacoustic models. For example, the parameter extraction unit 102B groups the whole hybrid domain into P×Q parameter tiles, as shown in FIG. 6. The number Q of a parameter band m covering the full frequency range can be set to a desired number from only a few (for low bit rate application) up to 28 (for high-quality processing) to closely mimic the frequency resolution of the human auditory system. And the parameter sets l cover a fixed time segment (about 20 ms to 30 ms), separated to improve transitional behavior.

The downmix unit 102A generates a downmix signal component for each parameter tile (l, m) (where l=1, ..., P, and m=1, ..., Q) included in the intermediate downmix signal 112, based on the following formula 2.

[Mathematical Expression 2]

$$dmx(n, k) = e(l, m) \sum_{i=1}^{N_A} d_i(l, m) x_i^{n,k} \qquad \text{(Formula 2)}$$

where $d_i$ (l, m) represents a predetermined scale factor for each of the input audio signals 110 (each of the frequency signals 111). The factor e (l, m) is used to adjust a power of a signal component. In other words, the power of signal components in the intermediate downmix signal 112 is computed to be approximately the same as the corresponding power in all scaled frequency signals 111. In other words, e (l, m) is determined to satisfy a relationship expressed by the following formula 3.

[Mathematical Expression 3]

$$\sum_{n \in l} \sum_{k \in m} |dmx(n, k)|^2 \approx \sum_{i \in N_A} \sum_{n \in l} \sum_{k \in m} |x_i^{n,k}|^2 \qquad \text{(Formula 3)}$$

The F-T transform unit 103 transforms the all signal components in the intermediate downmix signal 112 back to time domain to generate a downmix time signal 114.

The downmix encoder 104 codes the downmix time signal 114 to generate a downmix sub-stream 115.

On the same parameter tile (l, m), the parameter extraction unit 102B extracts object parameters. Typically, these parameters include:

(a) object level difference (OLD): the ratio of the powers of corresponding parameter tiles of the plurality of frequency signals 111;

(b) absolute energy parameters (NRG): the absolute object energy of a frequency signal 111 with highest energy among the plurality of frequency signals 111;

(c) inter-object cross correlation (IOC): a similarity measure of the corresponding parameter tiles of the plurality of frequency signals 111;

(d) downmix gains (DMG): a gain of down-mixing of a corresponding parameter tile.

For example, the parameter extraction unit 102B calculates these parameters using the following formulas 5 to 9.

[Mathematical Expression 4]

$$OLD_i(l, m) = \frac{\sum_{n \in l} \sum_{k \in m} x_i^{n,k} x_j^{n,k*}}{\max_j \left( \sum_{n \in l} \sum_{k \in m} x_i^{n,k} x_j^{n,k*} \right)} \qquad \text{(Formula 4)}$$

where $i = 1, \ldots, N_A; j = 1, \ldots, N_A$

[Mathematical Expression 5]

$$NRG(l, m) = \max_j \left( \sum_{n \in l} \sum_{k \in m} x_i^{n,k} x_j^{n,k*} \right) \qquad \text{(Formula 5)}$$

where $i = 1, \ldots, N_A; j = 1, \ldots, N_A$

[Mathematical Expression 6]

$$IOC_{i,j}(l, m) = \text{Re}\left\{ \frac{\sum_{n \in l} \sum_{k \in m} x_i^{n,k} x_j^{n,k*}}{\sqrt{\sum_{n \in l} \sum_{k \in m} x_i^{n,k} x_i^{n,k*} \sum_{n \in l} \sum_{k \in m} x_j^{n,k} x_j^{n,k*}}} \right\}$$ (Formula 6)

where $i = 1, \ldots, N_A; j = i+1, \ldots, N_A$

[Mathematical Expression 7]

$$DMG_i(l, m) = 20 \log_{10}(d_i(l, m) + \epsilon) \text{ where } i=1, \ldots, N_A$$ (Formula 7)

The parameter extraction unit 102B quantizes the object parameters together with other header information, to generate a parameter sub-stream 113.

Following the similar coding procedures, each other site 301 (sites 301B, 301C, or 301D) also generates such a downmix sub-stream 115 and its associated parameter sub-stream 113.

Figure 7:
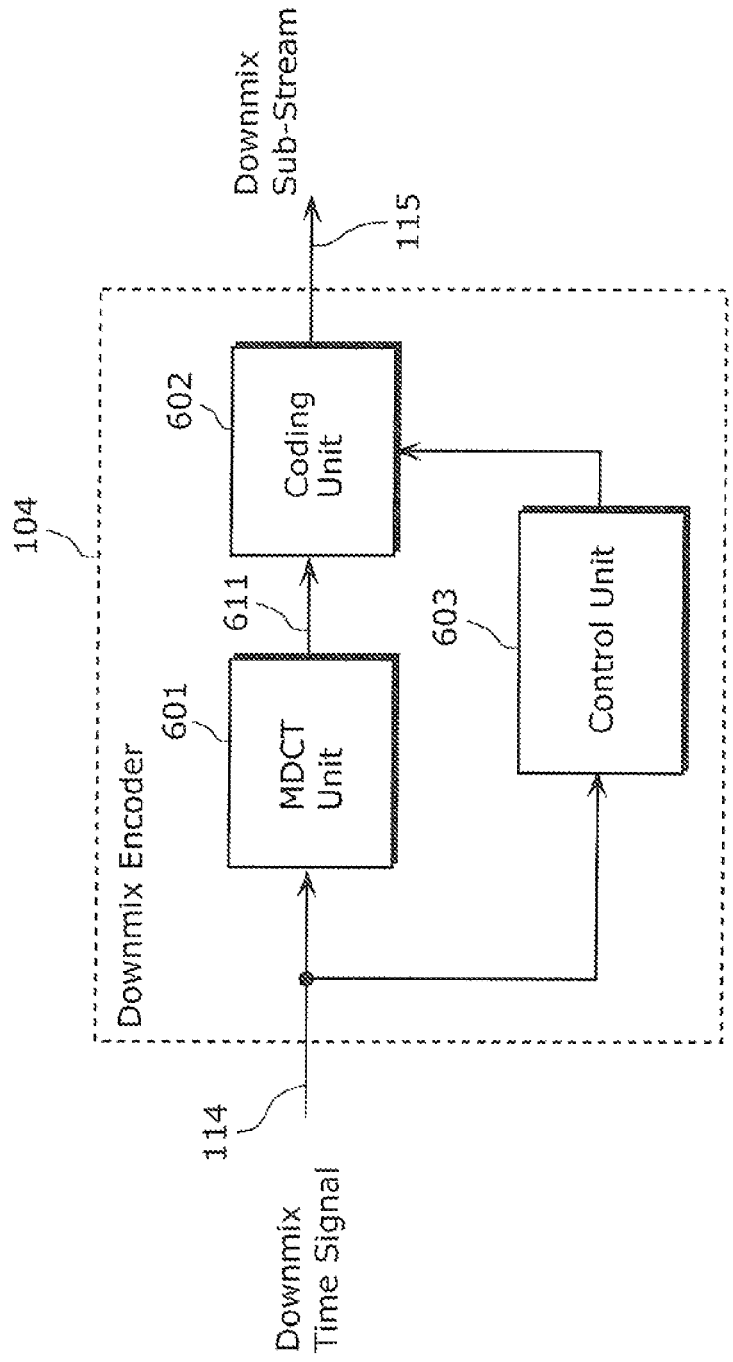
FIG. 7 is a block diagram of a downmix encoder according to the first embodiment of the present invention.

Next, a structure of the downmix encoder 104 is described. FIG. 7 is a block diagram showing the structure of the downmix encoder 104.

As shown in FIG. 7, the downmix encoder 104 includes a Modified Discrete Cosine Transform (MDCT) unit 601, a coding unit 602, and a control unit 603.

The MDCT unit 601 transforms the downmix time signal 114 in time domain into a MDCT coefficient set 611 in MDCT domain (spectrum domain).

The control unit 630 calculates an estimation value of the actual (time dependent) masked threshold value (psychoacoustic model) using rules known from psychoacoustics.

The coding unit 602 efficiently quantizes and codes the MDCT coefficient set 611 with the aim of keeping the quantization noise, below the masked threshold value calculated by the control unit 603. Thereby, the coding unit 602 generates a downmix sub-stream 115.

In addition, it is noted that for adopting the MCU 305A to combine a plurality of coded bitstreams 116, there are two additional requirements for the coding device 110 in each of the sites 301A to 301D.

(1) the NRG parameters have to be transmitted to the MCU 305A.
(2) the downmix sub-stream 115 is coded by the Advanced Audio Coding (AAC) method with fixed block type (namely, long block type).

It should be noted that it has been described that downmix sub-streams 115 are coded by using the AAC method, but the present invention is not limited to the above. Downmix sub-streams 115 may be coded by using a Low Delay Advanced Audio Coding (AAC-LD) method or a High-Efficiency Advanced Audio Coding (HE-AAC) method. A Code Excited Linear Prediction (CELP) method is also possible if it is a high-efficient stereo/monaural audio coding method. However, it is more efficient to use a coding method employing orthogonal transformation technologies such as MDCT.

It should also be noted that the MDCT method has been described as a representative of the orthogonal transformation technologies, but the present invention is not limited to the above. A Fast Fourier Transform (FFT) method and a Modified Discrete Sine Transform (MDST) method are also possible.

Next, the structure of the MCU 305A according to the first embodiment of the present invention is described.

Figure 8:
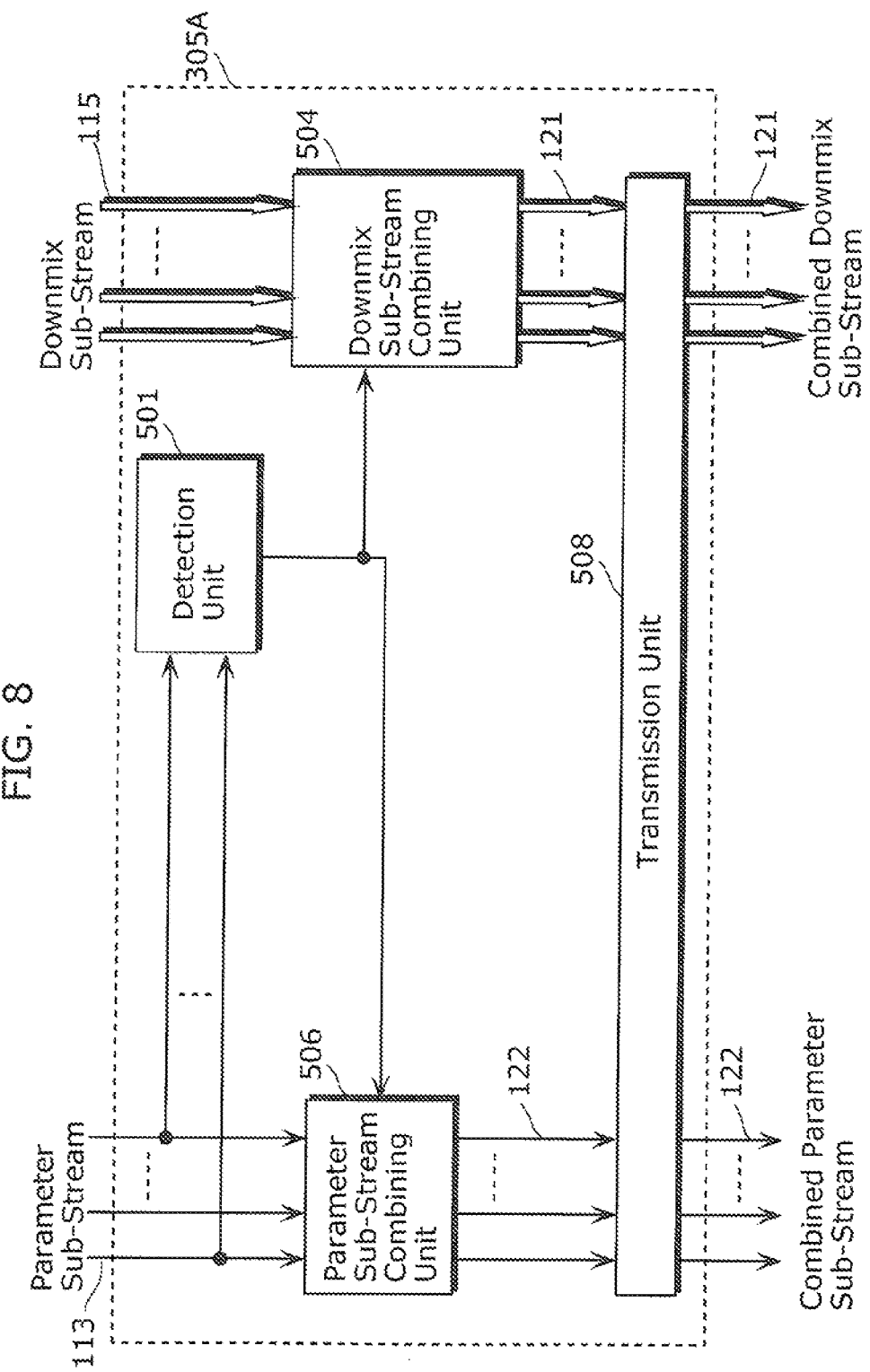
FIG. 8 is a block diagram of a MCU according to the first embodiment of the present invention.

FIG. 8 is a block diagram showing the structure of the MCU 305A.

As shown in FIG. 8, the MCU 305 includes a detection unit 501, a downmix sub-stream combining unit 504 (first combining unit), a parameter sub-stream combining unit 506 (second combining unit), and a transmission unit 508.

The detection unit 501 detects active sites and inactive sites from the plurality of sites 301 in a predetermined time interval for each predetermined time interval. Here, the active sites refer to sites each transmitting an effective coded bitstream 116, and the inactive sites refer to sites except the active sites. More specifically, an active site is a site which currently transmits audio, while an inactive site is a site which does not transmit audio currently, exchanges an audio signal having a value equal to or less than a predetermined threshold value, or is expressly designated by a control signal as not exchanging any audio signal. For example, a maximum volume of a plurality of input audio signals 110 which are received by an active site is equal to or more than a predetermined threshold value, while each of all volumes of a plurality of input audio signals 110 which are received by an inactive site is less than the predetermined threshold value.

For example, the detection unit 501 detects whether each of the sites 301 is an active site or an inactive site, using information included in a plurality of parameter sub-streams 113. For instance, the detection unit 501 determines, as an inactive site, a site transmitting a parameter sub-stream 113 having a NRG parameter that is less than the predetermined threshold value.

Here, the detection unit 501 may determine whether each of the sites 301 is an active site or an inactive site, with reference to another different parameter or a different downmix sub-stream 115. For example, it is also possible that the detection unit 501 determines that a target site 301 transmitting a coded bitstream 116 is an active site if a maximum volume of a plurality of input audio signals 110 which are included in the coded bitstream 116 transmitted by the target site 301 is equal to or more than a predetermined threshold value, and that the detection unit 501 determines that the target site 301 is an inactive site if each of all volumes of the plurality of input audio signals 110 which are included in the coded bitstream 116 transmitted by the target site 301 is less than the predetermined threshold value. It is further possible that the detection unit 501 determines whether a target site 301 transmitting a coded bitstream 116 is an active site or an inactive site, depending on a volume difference or a volume change rate of a plurality of input audio signals 110 included in the coded bitstream 116.

Furthermore, the detection unit 501 calculates the number of active sites and the number of inactive sites, based on a result of the detection.

The downmix sub-stream combining unit 504 combines a plurality of downmix sub-streams 115 depending on the number of active sites (the number of inactive sites) detected by the detection unit 501 in order to generate a plurality of combined downmix sub-streams 121.

More specifically, if there is any inactive site, the downmix sub-stream combining unit 504 combines only downmix sub-streams 115 transmitted from active sites in order to generate combined downmix sub-streams 121.

In more detail, the downmix sub-stream combining unit 504 generates combines a combined downmix sub-stream 121 for each of the plurality of sites 301 (each target site 301), by combining a plurality of downmix sub-streams 115 transmitted from the other sites 301 except the target site 301 from among a plurality of downmix sub-streams 115 transmitted from a plurality of active sites.

The parameter sub-stream combining unit 506 combines a plurality of parameter sub-streams 113 depending on the number of active sites (the number of inactive sites) detected by the detection unit 501 in order to generate a plurality of combined parameter sub-streams 122.

More specifically, if there is an inactive site, the parameter sub-stream combining unit 506 combines only parameter sub-streams 113 transmitted from the active sites in order to generate combined parameter sub-streams 122.

In more detail, the parameter sub-stream combining unit 506 generates a combined parameter sub-stream 122 for each of the plurality of sites 301 (each target site 301), by combining a plurality of parameter sub-streams 113 received from the other sites 301 except the target site 301 from among a plurality of parameter sub-streams 113 received from a plurality of active sites.

The transmission unit 508 transmits a combined bitstream 124 that includes the combined downmix sub-stream 121 and the combined parameter sub-stream 122, to a corresponding one of the sites 301.

The following describes a structure of the downmix sub-stream combining unit 504.

Figure 9:
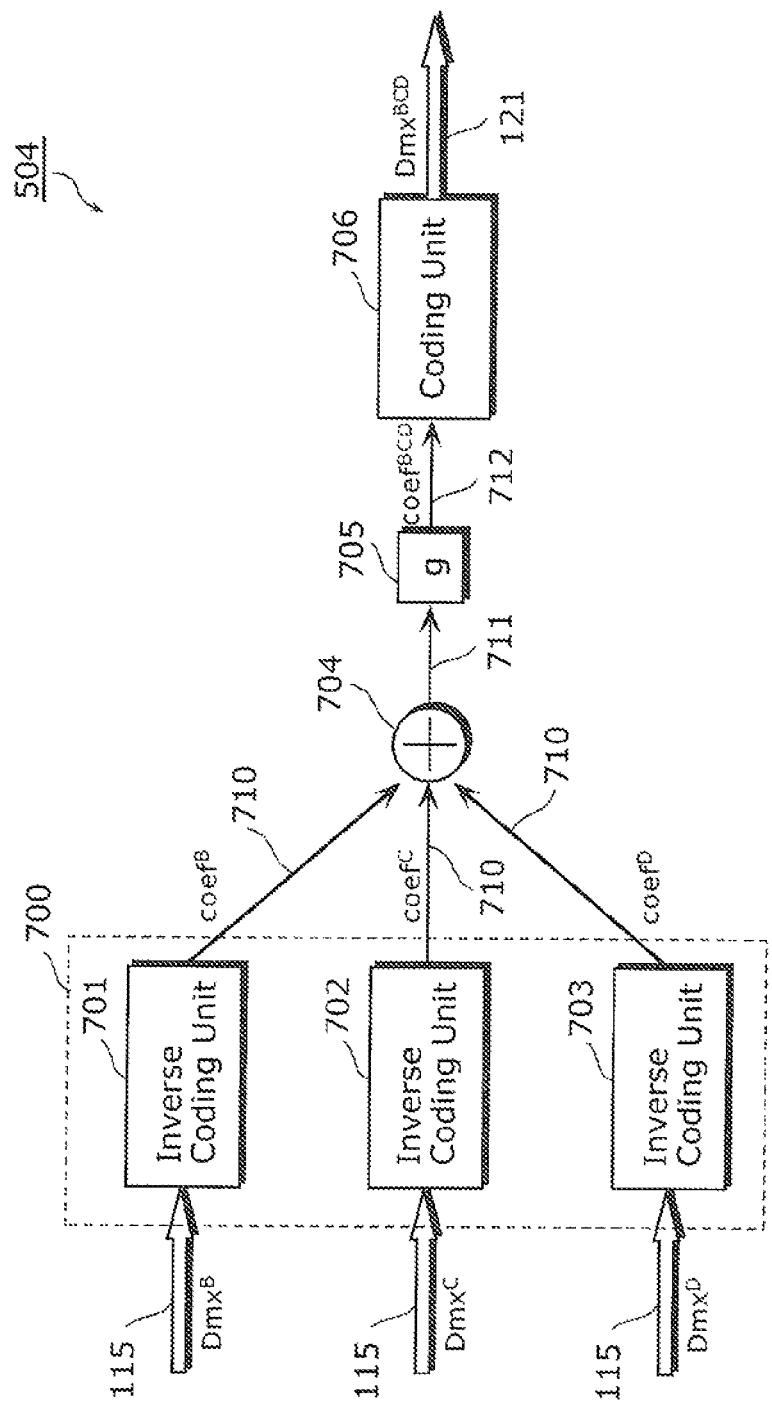
FIG. 9 is a block diagram of a downmix sub-stream combining unit according to the first embodiment of the present invention.

FIG. 9 is a block diagram showing the structure of the downmix sub-stream combining unit 504. As shown in FIG. 9, the downmix sub-stream combining unit 504 includes a decoding unit 700, an adder (adding unit) 704, a scaling unit 705, and a coding unit 706. FIG. 9 shows the situation where a single combined downmix sub-stream 121 is generated to be transmitted to the site 301A.

The decoding unit 700 decodes (inversely codes and inversely quantizes) a plurality of downmix sub-streams 115 ($Dmx^B$, $Dmx^C$, and $Dmx^D$) to generate MDCT coefficient sets 710 ($coef^B$, $coef^C$, and $coef^D$) in a MDCT domain (spectrum domain) which correspond to the downmix sub-streams 115 ($Dmx^B$, $Dmx^C$, and $Dmx^D$), respectively. Here, the inverse coding and the inverse quantization are inverse operations of the AAC coding performed by the coding unit 602 shown in FIG. 7. The decoding unit 700 includes inverse coding units 701 to 703 which inversely code and inversely quantize the downmix sub-streams $Dmx^B$, $Dmx^C$, and $Dmx^D$, respectively.

Here, as shown in FIG. 9, the decoding unit 700 may have three inverse coding units 701 to 703 to process three downmix sub-streams 115 in parallel by the three inverse coding units 701 to 703. It is also possible that the decoding unit 700 has one or two inverse coding units to process three downmix sub-streams 115 by time sharing.

The decoding unit 700 decodes only downmix sub-streams 115 received from active sites, from among the plurality of downmix sub-streams 115.

The adder 704 sums all of the MDCT coefficient sets 710 (the decoded downmix sub-streams) to generate a combined MDCT coefficient set 711 (an intermediate combined downmix sub-stream).

The scaling unit 705 scales the summed combined MDCT coefficient set 711 to generate a combined MDCT coefficient set 712 ($coef^{BCD}$). More specifically, the scaling unit 705 scales the combined MDCT coefficient set 711 so that spectrum power of the plurality of MDCT coefficient sets 710 is preserved in the combined MDCT coefficient set 712.

In the first embodiment of the present invention, the combined downmix sub-stream 121 can be generated as a linear combination of all downmix sub-streams 115 with different combination gain at different frequency ranges.

Recall that the MDCT domain only provides frequency resolution, while the hybrid domain provides time/frequency resolution. As a result, whey applying combination gains on MDCT coefficient set, it is necessary to approximate a value in the hybrid domain to a value in the MDCT domain.

Figure 10:
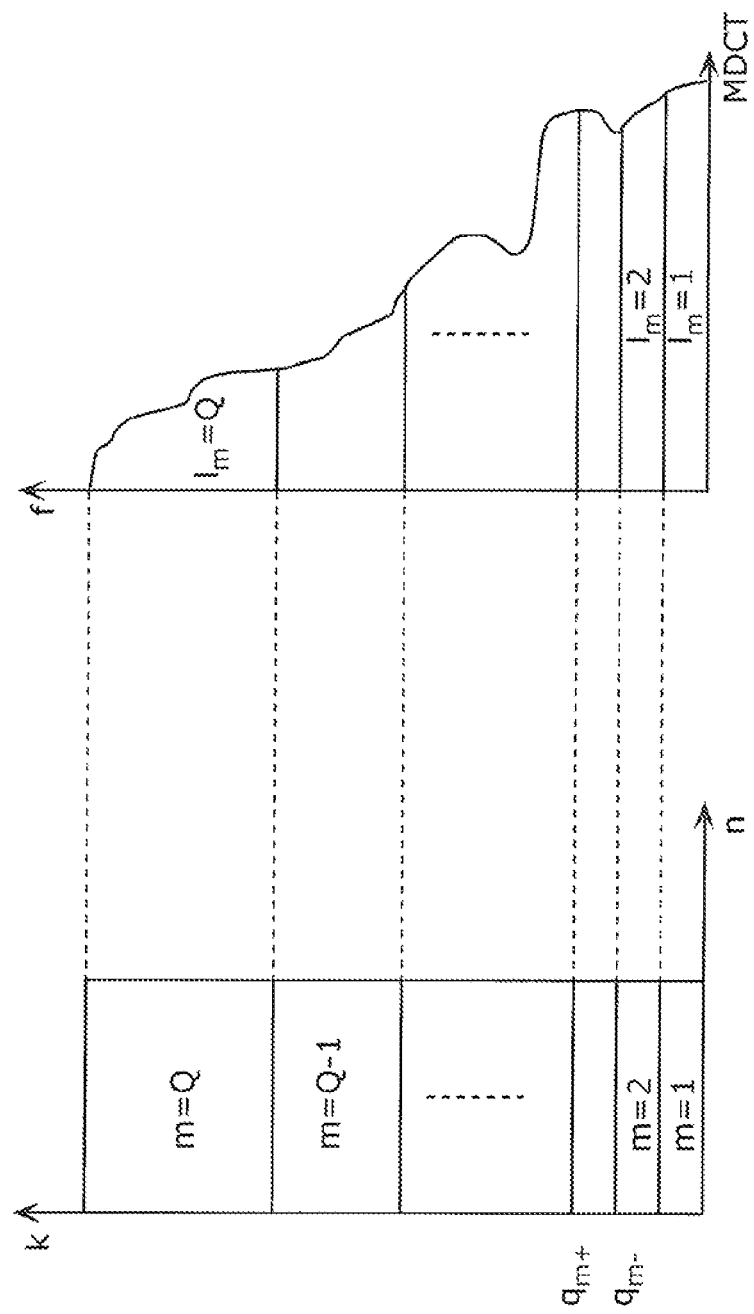
FIG. 10 is a graph plotting a frequency mapping method for mapping from a QMF domain to a MDCT domain according to the first embodiment of the present invention.

An approximation method adopted in the first embodiment of the present invention is ignore the parameter set separation, and to map the parameter band separation method into MDCT domain directly (later will show how to consolidate different parameter band separation methods into one unified parameter band separation method). That is, as shown in FIG. 10, if there are Q parameter bands (some header information provided by parameter sub-stream) used for the parametric coding process, there are Q MDCT frequency sub-sets is $I_m$ (where m=1, 2, . . . , Q), and the parameter band m covers the same frequency range as the sub-set $I_m$ say ($q_{m-}$, $q_{m+}$).

Based on the above MDCT spectral division, in the following, the combination gain of the divided downmix coefficient set can be designated flexibly according to the different application scenarios.

In the first embodiment, in the scenario that all of a plurality of coded audio objects are important, it is undesirable for the amplification or attenuation of signal components. In this case, power-preservation technique is adopted by applying a common scaling factor to equalize the combined downmix coefficients.

More specifically, a combined MDCT coefficient set $coef^{BCD}$ is expressed by the following formula 8.

[Mathematical Expression 8]

$$coef_{BCD}(i)=(coef_B(i)+coef_C(i)+coef_D(i))*g(m) \quad \text{(Formula 8)}$$

where i represents a MDCT coefficient index, and m represents a sub-set index. More specifically, i is expressed by the following formula 9.

[Mathematical Expression 9]

$$i \in I_m \quad \text{(Formula 9)}$$

The superscript represents a site index for the corresponding parameters.

The combination gain can be calculated for preserving spectrum power by the following formula 10.

[Mathematical Expression 10]

$$g(m) = \sqrt{\frac{\sum_{i \in I_m}(coef^B(i))^2 + \sum_{i \in I_m}(coef^C(i))^2 + \sum_{i \in I_m}(coef^D(i))^2}{\sum_{i \in I_m}(coef^B(i) + coef^C(i) + coef^D(i))^2}} \quad \text{(Formula 10)}$$

The coding unit 706 quantizes and codes the combined MDCT coefficient set $coef^{BCD}$ to generate a combined downmix sub-stream 121 ($Dmx^{BCD}$) to be transmitted, Note that in general, a perceptual encoder (for example, an AAC encoder) explores signal irrelevancy by using a psychoacoustic masker, derived from the complex FFT on the time domain sequence using rules known from psychoacoustics. However, in the MCU 305A according to the first embodiment of the present invention, for the requirement of low complexity and low latency, the downmix combination is limited in MDCT domain and it is unallowable for any domain transformation from MDCT to time domain.

The problem can be solved by using some conventional techniques. For example, in the conventional technologies, a MDCT-based psychoacoustic model can be calculated with low complexity and high quality. Its main idea is to replace the complex FFT spectrum with the real MDCT spectrum, and to calculate the tonality by spectral flatness measure.

The conventional technology is for example detailed in the above-listed Non-Patent References 1 to 3, for example.

With the above technique, the coding unit 706 can be designed as: 1) firstly calculate an accurate psychoacoustic maker for the combined coefficient set on the MDCT domain; 2) conduct the remaining quantization and coding schemes in the similar way as in AAC encoder. Its output is transmitted to the parametric decoding device 200 at site 301A as the combined downmix sub-stream 121. The same procedure is carried out for all other sites. That is, the procedures are conducted N times for an N-site system.

Next, the structure of the parameter sub-stream combining unit 506 is described.

Figure 11:
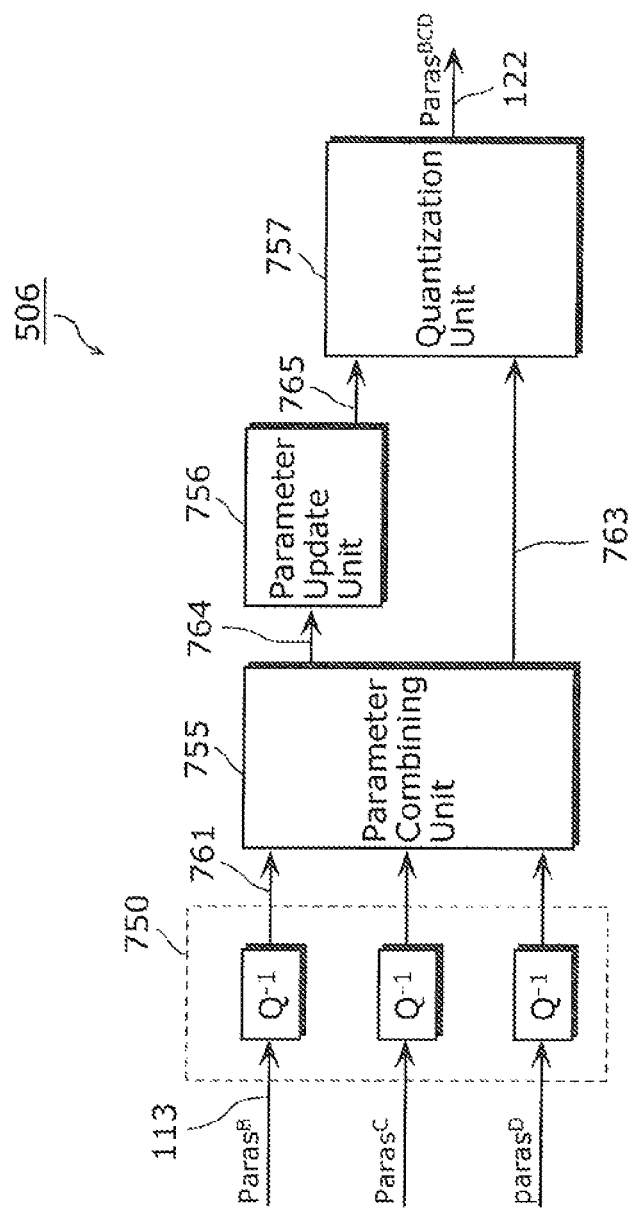
FIG. 11 is a block diagram of a parameter sub-stream combining unit according to the first embodiment of the present invention.

FIG. 11 is a block diagram showing a structure of the parameter sub-stream combining unit 506. As shown in FIG. 11, parameter sub-stream combining unit 506 includes an inverse quantization unit 750, a parameter combining unit 755, a parameter update unit 756, and a quantization unit 757. FIG. 11 shows only a structure for generating a single combined parameter sub-stream 122 to be transmitted to the site 301A.

The inverse quantization unit 750 inversely quantizes a plurality of parameter sub-streams 113 (Paras$^B$, Paras$^C$, and Paras$^D$) to reconstruct respective parameters 761. Here, the inverse quantization is inverse operation of the quantization performed by the parameter extraction unit 102B shown in FIG. 1.

The parameter combining unit 755 combines all of the parameters 761 to generate combined parameters 763 and 764.

The parameter update unit 756 updates the combined parameter 764 to generate an updated parameter 765.

In addition, the parameter combining unit 755 performs the combining process using the same combination gain for all of the parameters 761. As a result, this downmix combining process is not influenced by additional parameters. Therefore, if there are a plurality of active sites, the parameter update unit 756 updates only a NRG parameter and an OLD parameter as the combined parameter 764.

For example, the example where the sites 301A, 301B, and 301D are active sites is explained. In this example, the parameter sub-stream combining unit 506 combines parameter sub-streams 113 transmitted from the sites 301B and 301D.

The updated NRG parameter is a maximum NRG parameter in a site k (where k=B, D). In other words, the parameter update unit 756 calculates an updated NRG parameter using the following formula 11.

[Mathematical Expression 11]

$$NRG^{comb}(l, m) = \max_k (NRG^k(l, m)) \quad \text{(Formula 11)}$$

The parameter update unit 756 calculates an updated OLD parameter for each of the objects by using the following formula 12. The object indicates a corresponding one of the plurality of input audio signals 110.

[Mathematical Expression 12]

$$OLD_i^{comb}(l, m) = OLD_i^k(l, m) \frac{NRG^k(l, m)}{NRG^{comb}(l, m)} \quad \text{(Formula 12)}$$

where the objet index i is i=1, ... $N_A$, $N_A+1$, $N_A+N_D$.

The quantization unit 757 quantizes the combined parameter 763 and the updated parameter 765 to generate a combined parameter sub-stream 122.

It is noted that in a teleconference system with N sites, usually, there are only $N_1$ sites (where $N_1 \leq N$) are active (with efficient transmitted bitstream) and remaining (N−$N_1$) sites are inactive.

For such a system, the MCU 305A needs N partial decoding processes, N combining processes, and N partial coding processes. However, it is clear that the same combined downmix sub-stream 121 should be distributed for those inactive sites. It means the combination scheme has redundancy for a scenario where inactive sites are usually presented.

Thus, in the first embodiment of the present invention, the complexity of the MCU 305A is further reduced if the number of active sites is taken into account before the combining and coding processing.

In addition, note that if only one or two sites are active, the transmission unit 508 switches the received coded bitstream 116 to the distributing sites directly. As a result, the complexity of the MCU 305A can be further reduced.

In further detail, when two or more sites are inactive, the downmix sub-stream combining unit 504 combines a plurality of downmix sub-streams 115 transmitted from all active sites to generate a common combined downmix sub-stream 121 for all of the inactive sites. The parameter sub-stream combining unit 506 combines a plurality of parameter sub-streams 113 received from all active sites to generate a common combined parameter sub-stream 122 for all of the inactive sites. The transmission unit 508 transmits a common combined bitstream 124 including the combined downmix sub-stream 121 and the common combined parameter sub-stream 122 to each of the inactive sites.

When two sites are active, the transmission unit 508 transmits a coded bitstream 116 received from one of the two active sites to the other one of the two active sites without a combining process. In addition, the transmission unit 508 transmits a coded bitstream 116 received from the other one of the two active sites to the one of the two active sites without a combining process.

When one site is active, the transmission unit 508 transmits a coded bitstream 116 received from the active site to each of the inactive sites.

Figure 13:
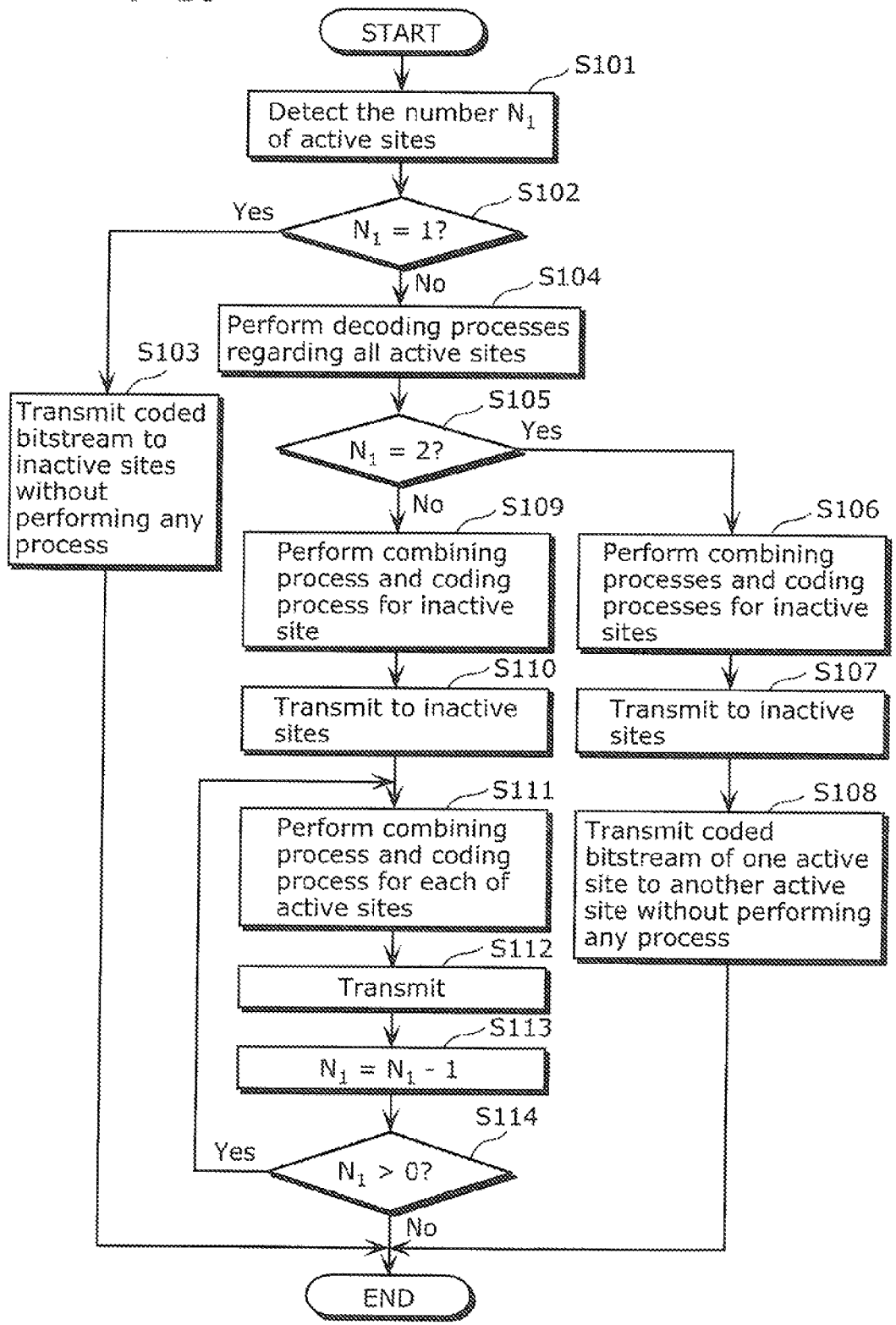
FIG. 13 is a flowchart of a combining process performed by the MCU according to the first embodiment of the present invention.

FIG. 12 is a table showing the complexity of the MCU 305A according to the first embodiment of the present invention and the complexity of a conventional MCU. FIG. 13 is a flowchart of the combining process performed by the MCU 305.

As shown in FIG. 13, first, the detection unit 501 detects the number $N_1$ of active sites (S101).

Next, the detection unit 501 determines whether or not the number $N_1$ of active sites is one (S102).

If the number $N_1$ of active site(s) is one (Yes at S102), the transmission unit 508 transmits a coded bitstream 116 received from the active site to every inactive site directly without a combining process (S103). In other words, each of the downmix sub-stream combining unit 504 and the parameter sub-stream combining unit 506 does not perform any combining process. The transmission unit 508 does not transmit the coded bitstream 116 and a combined bitstream 124 to the single active site.

Here, if the number of active site(s) is zero, the transmission unit 508 does not transmit any coded bitstream 116 nor any combined bitstream 124.

As described above, if the number $N_1$ of active site(s) is one (Yes at S102), each of the number of partial decoding processes, the number of combining processes, and the number of partial coding processes is zero as shown in FIG. 12.

Figure 14:
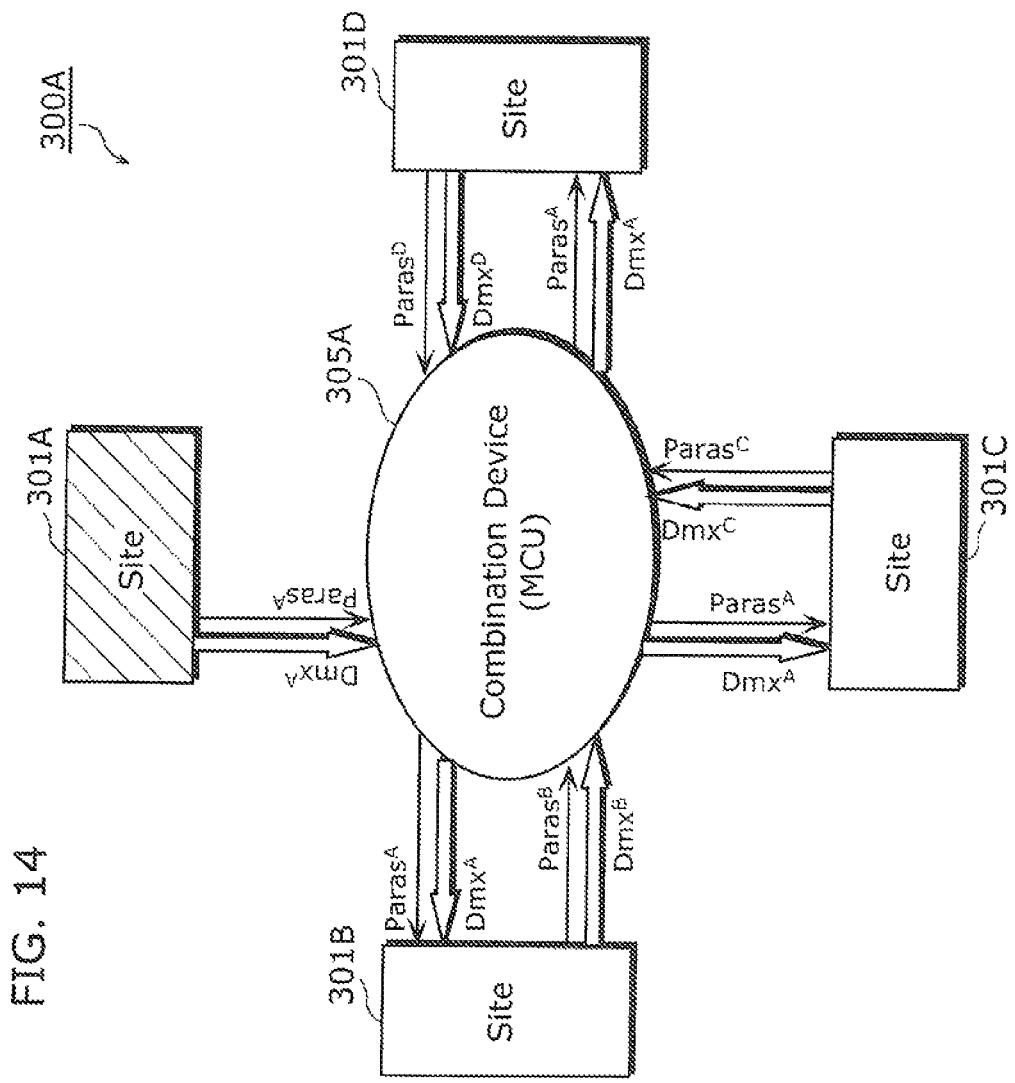
FIG. 14 is a diagram showing a process performed by the MCU in the situation where one site is active, according to the first embodiment of the present invention.

FIG. 14 is a diagram schematically showing a process of the MCU 305A when only one site 301A is active among the four sites 301. As shown in FIG. 14, when only the site 301A is active, the MCU 305A transmits the downmix sub-stream $Dmx^A$ and the parameter sub-stream $Paras^A$, which are received from the site 301A, to each of the inactive sites 301B, 301C, and 301D.

On the other hand, if the number $N_1$ of active site(s) is two or more (No at S102), the downmix sub-stream combining unit 504 partially decodes each of the downmix sub-streams 115 received from all of the active sites to generate a plurality of MDCT coefficient sets 710 (S104).

Next, the detection unit 501 determines whether or not the number $N_1$ of active sites is two (S105).

If the number $N_1$ of active sites is two (Yes at S105), then the downmix sub-stream combining unit 504 combines and scales the MDCT coefficient sets 710 of the two active sites to generate a combined MDCT coefficient set 712. Then, the downmix sub-stream combining unit 504 codes and quantizes the generated combined MDCT coefficient set 712 to generate a single combined downmix sub-stream 121 for inactive sites. The parameter sub-stream combining unit 506 combines parameter sub-streams 113 of the two active sites to generate a single combined parameter sub-stream 122 for inactive sites (S106).

Next, the transmission unit 508 transmits the combined downmix sub-stream 121 and the combined parameter sub-stream 122 generated at Step S106 to each of the inactive sites (S107).

In addition, the transmission unit 508 transmits a coded bitstream 116 received from one of the two active sites to the other one of the two active sites directly without a combining process, and transmits a coded bitstream 116 received from the other one of the two active sites to one of the two active sties directly without a combining process (S108).

As described above, if the number $N_1$ of active sites is two (Yes at S105), the number of partial decoding processes is two that is the same as the number $N_1$ of active sites, and each of the number of combining processes and the number of partial coding processes is one, as shown in FIG. 12. In other words, the partial decoding processes for the inactive sites are eliminated, and each of the number of combining processes and the number of partial coding processes is decreased to be one.

Figure 15:
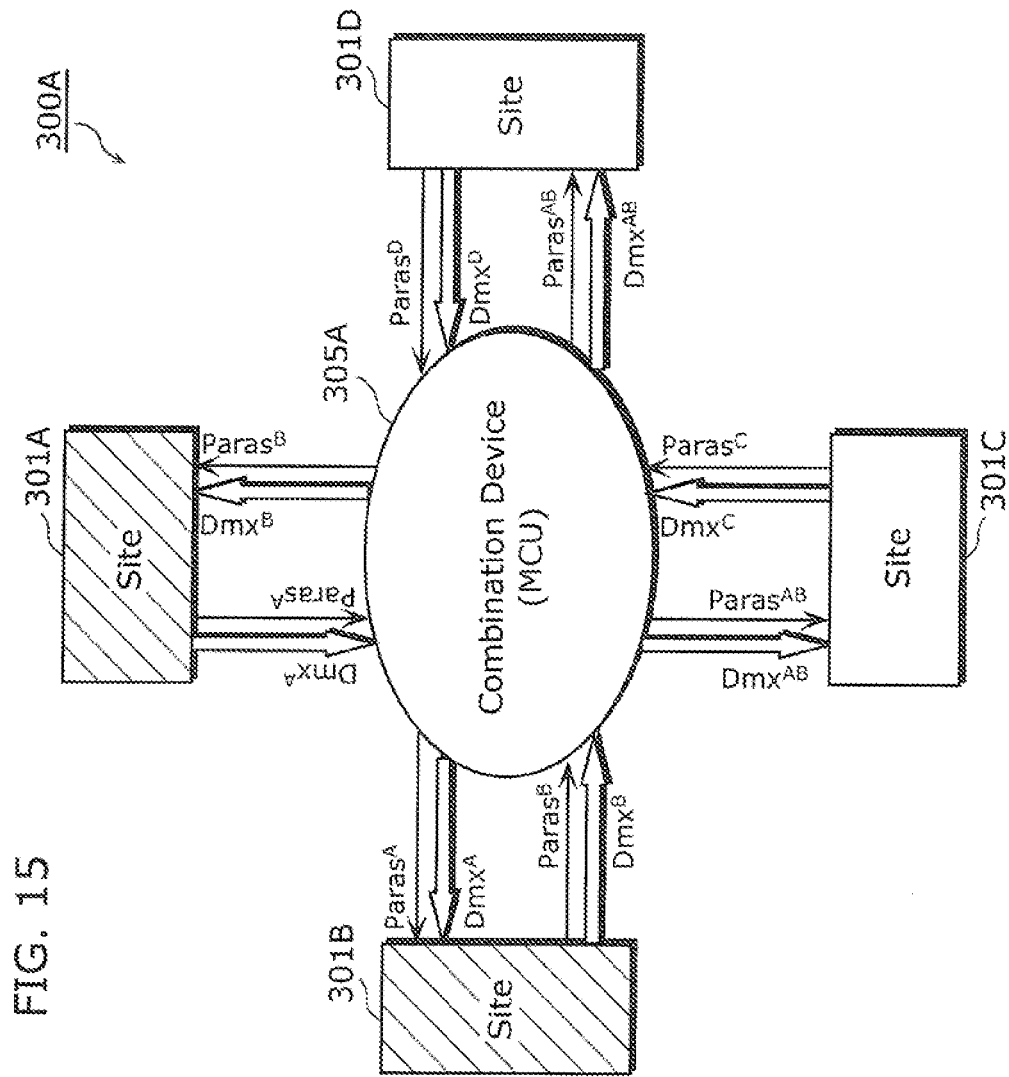
FIG. 15 is a diagram showing a process performed by the MCU in the situation where two sites are active, according to the first embodiment of the present invention.

FIG. 15 is a diagram schematically showing processes of the MCU 305A when two sites 301A and 301B are active among the four sites 301. As shown in FIG. 15, when only the sites 301A and 301B are active, the MCU 305A transmits a downmix sub-stream $Dmx^A$ and a parameter sub-stream $Paras^A$, which are received from the site 301A, to the active site 301B, and transmits a downmix sub-stream $Dmx^B$ and a parameter sub-stream $Paras^B$, which are received from the site 301B, to the active site 301A. In addition, the MCU 305A combines the downmix sub-stream $Dmx^A$, the parameter sub-stream $Paras^A$, the downmix sub-stream $Dmx^B$, and the parameter sub-stream $Paras^B$, to generate a combined downmix sub-stream $Dmx^{AB}$ and a combined parameter sub-stream $Paras^{AB}$ to be transmitted to each of the inactive sites 301C and 301D.

On the other hand, if the number $N_1$ of active sites is three or more (No at S105), then the downmix sub-stream combining unit 504 combines and scales all of the MDCT coefficient sets 710 of the three or more active sites to generate a combined MDCT coefficient set 712. Then, the downmix sub-stream combining unit 504 codes and quantizes the generated combined MDCT coefficient set 712 to generate a single combined downmix sub-stream 121 for an inactive site. In addition, the parameter sub-stream combining unit 506 combines parameter sub-streams 113 of the three or more active sites to generate a single combined parameter sub-stream 122 for the inactive site (S109).

Next, the transmission unit 508 transmits the single combined downmix sub-stream 121 and the single combined parameter sub-stream 122 generated at Step S109 to the inactive site (S110).

Next, the MCU 305A generates a combined bitstream 124 to be transmitted to each of the three or more active sites.

First, the MCU 305A selects one of the three or more active sites to generate a combined bitstream 124 to be transmitted to the selected active site.

In more detail, the downmix sub-stream combining unit 504 combines and scales MDCT coefficient sets 710 of all active sites expect the selected active site to generate a combined MDCT coefficient set 712. Then, the downmix sub-stream combining unit 504 codes and quantizes the generated combined MDCT coefficient set 712 to generate a combined downmix sub-stream 121 for the selected active site. In addition, the parameter sub-stream combining unit 506 combines parameter sub-streams 113 of all active sites except the selected active site to generate a combined parameter sub-stream 122 for the selected active site (S111).

Next, the transmission unit 508 transmits the combined downmix sub-stream 121 and the combined parameter sub-stream generated at Step S111 to the selective active site (S112).

Next, the downmix sub-stream combining unit 504 decreases the number $N_1$ of active sites by 1 to generate a new number $N_1$ of active sites (S113). If the new number $N_1$ of active sites is larger than zero (Yes at S114), then a next active site is selected to perform the steps of and after Step S111 for the newly selected active site. In other words, the downmix sub-stream combining unit 504 repeats Steps S111 to S114 for each of the active sties.

As described above, if there are two or more inactive sites and number $N_1$ of active sites is three or more (No at S105), the number of partial decoding processes is equal to the number $N_1$ of active sites, and each of the number of combining processes and the number of partial coding processes is $N_1+1$, as shown in FIG. 12. In to other words, the partial decoding processes for the inactive sites are eliminated, and each of the number of combining processes and the number of partial coding processes for transmission to inactive sites Is decreased.

Here, if there is no inactive site, namely, if the number $N_1$ of active sites is equal to the number N of all sites, Steps S109 and S110 are not performed. In other words, as shown in FIG. 12, each of the number of partial decoding processes, the number of combining processes, and the number of partial coding processes is $N_1$.

Figure 16:
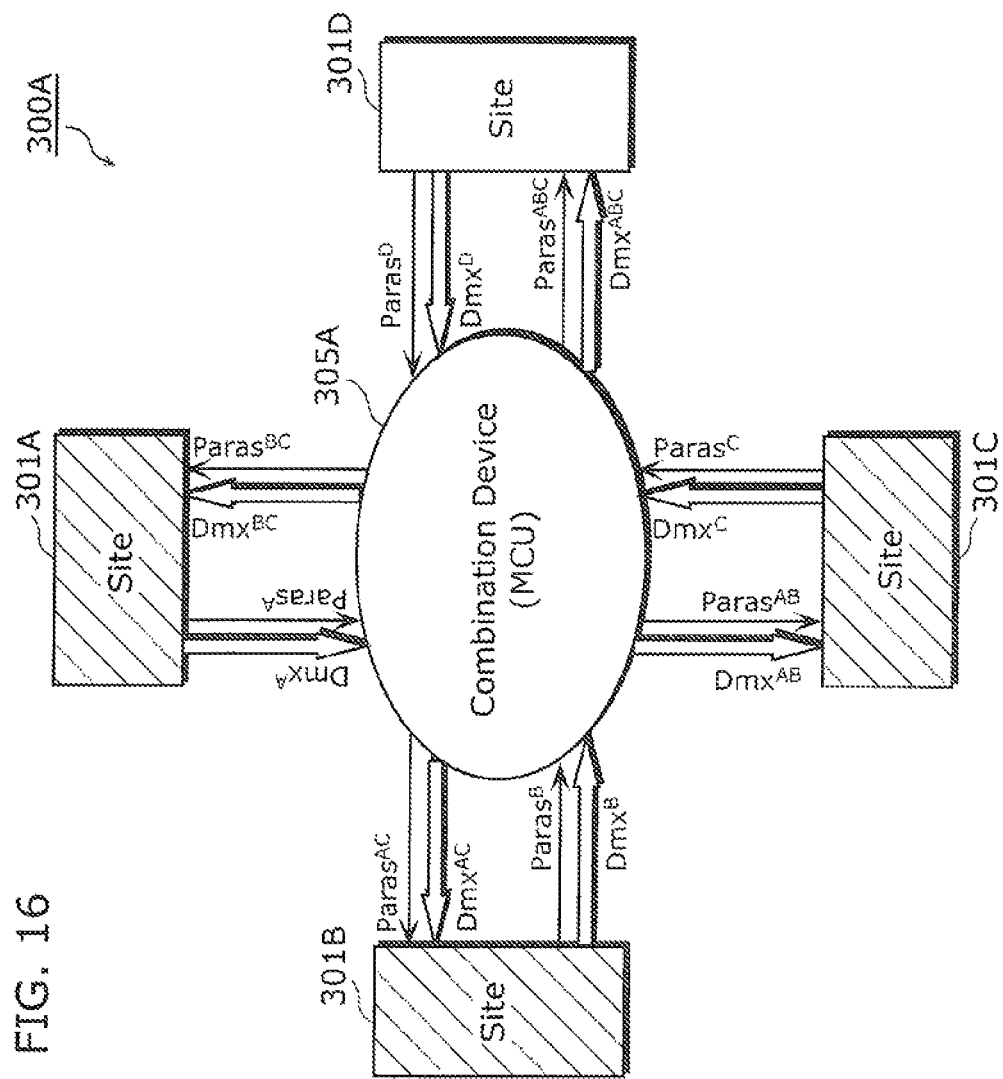
FIG. 16 is a diagram showing a process performed by the MCU in the situation where three sites are active, according to the first embodiment of the present invention.

FIG. 16 is a diagram schematically showing processes of the MCU 305 when three sites 301A, 301B, and 301C are active among the four sites 301. As shown in FIG. 16, when the sites 301A, 301B, and 301C are active, the MCU 305A combines the downmix sub-stream $Dmx^A$, the parameter sub-stream $Paras^A$, the downmix sub-stream $Dmx^B$, the parameter sub-stream $Paras^B$, the downmix sub-stream $Dmx^C$, and the parameter sub-stream $Paras^C$ to generate a combined downmix sub-stream $Dmx^{ABC}$ and a combined parameter sub-stream $Paras^{ABC}$. Then, the MCU 305A transmits the combined downmix sub-stream $Dmx^{ABC}$ and the combined parameter sub-stream $Paras^{ABC}$ to an inactive site 301.

Furthermore, the MCU 305A combines the downmix sub-stream $Dmx^B$, the parameter sub-stream $Paras^B$, the downmix sub-stream $Dmx^C$, and the parameter sub-stream $Paras^C$ to generate a combined downmix sub-stream $Dmx^{BC}$ and a combined parameter sub-stream $Paras^{BC}$. Then, the MCU 305A transmits the combined downmix sub-stream $Dmx^{BC}$ and the combined parameter sub-stream $Paras^{BC}$ the site 301A.

Still further, the MCU 305A combines the downmix sub-stream $Dmx^A$, the parameter sub-stream $Paras^A$, the downmix sub-stream $Dmx^C$, and the parameter sub-stream $Paras^C$ to generate a combined downmix sub-stream $Dmx^{AC}$ and a combined parameter sub-stream $Paras^{AC}$. Then, the MCU 305A transmits the combined downmix sub-stream $Dmx^{AC}$ and the combined parameter sub-stream $Paras^{AC}$ to the site 301B.

Still further, the MCU 305A combines the downmix sub-stream $Dmx^A$, the parameter sub-stream $Paras^A$, the downmix sub-stream $Dmx^B$, and the parameter sub-stream $Paras^B$ to generate a combined downmix sub-stream $Dmx^{AB}$ and a combined parameter sub-stream $Paras^{AB}$. Then, the MCU 305A transmits the combined downmix sub-stream $Dmx^{AB}$ and the combined parameter sub-stream $Paras^{AB}$ to the site 301C.

As described above, when the number $N_1$ of active sites is one, the MCU 305A according to the first embodiment does not perform decoding process, combining process, nor coding process. When the number $N_1$ of active sites is two, the MCU 305A does not perform a combined bitstream 124 to be transmitted to an active site. Thereby, the MCU 305A can reduce complexity.

When there is an inactive site, the MCU 305A according to the first embodiment of the present invention does not combine coded bitstreams 116 received from the inactive site. In more detail, the MCU 305A does not decode a downmix sub-stream 115 transmitted from the inactive site. Thereby, the MCU 305A can reduce complexity.

When there are a plurality of inactive sites, the MCU 305A according to the first embodiment of the present invention generates a combined bitstream 124 common in the plurality of inactive sites. Thereby, the MCU 305A can eliminate a process of generating a combined bitstream 124 to be transmitted to the inactive sites, thereby reducing complexity.

As described above, taken into account of these special cases where one or two sites are active, the complexity of the MCU 305A according to the first embodiment of the present invention can be reduced.

For example, to illustrate the effects of the first embodiment of the present invention, let's consider a multi-site (for example, eight sites) teleconference system. In practice, it's common that at most of communication period, at most three communication sites are in active status simultaneously. In this case, by employing the inventive MCU 305A according to the first embodiment of the present invention, the complexity can be reduced as low as 15% to 40% of the conventional MCU complexity.

(Second Embodiment)

Note that among the MCU 305A involved operations, the partial coding process has the highest complexity because of the inclusive acoustic masker generation and double-looped quantization. Thus, in the second embodiment of the present invention, if there are a plurality of active sites (where $N_1 > 2$), the complexity of a MCU 305B can be further reduced by using the partial coding only once.

Figure 17:
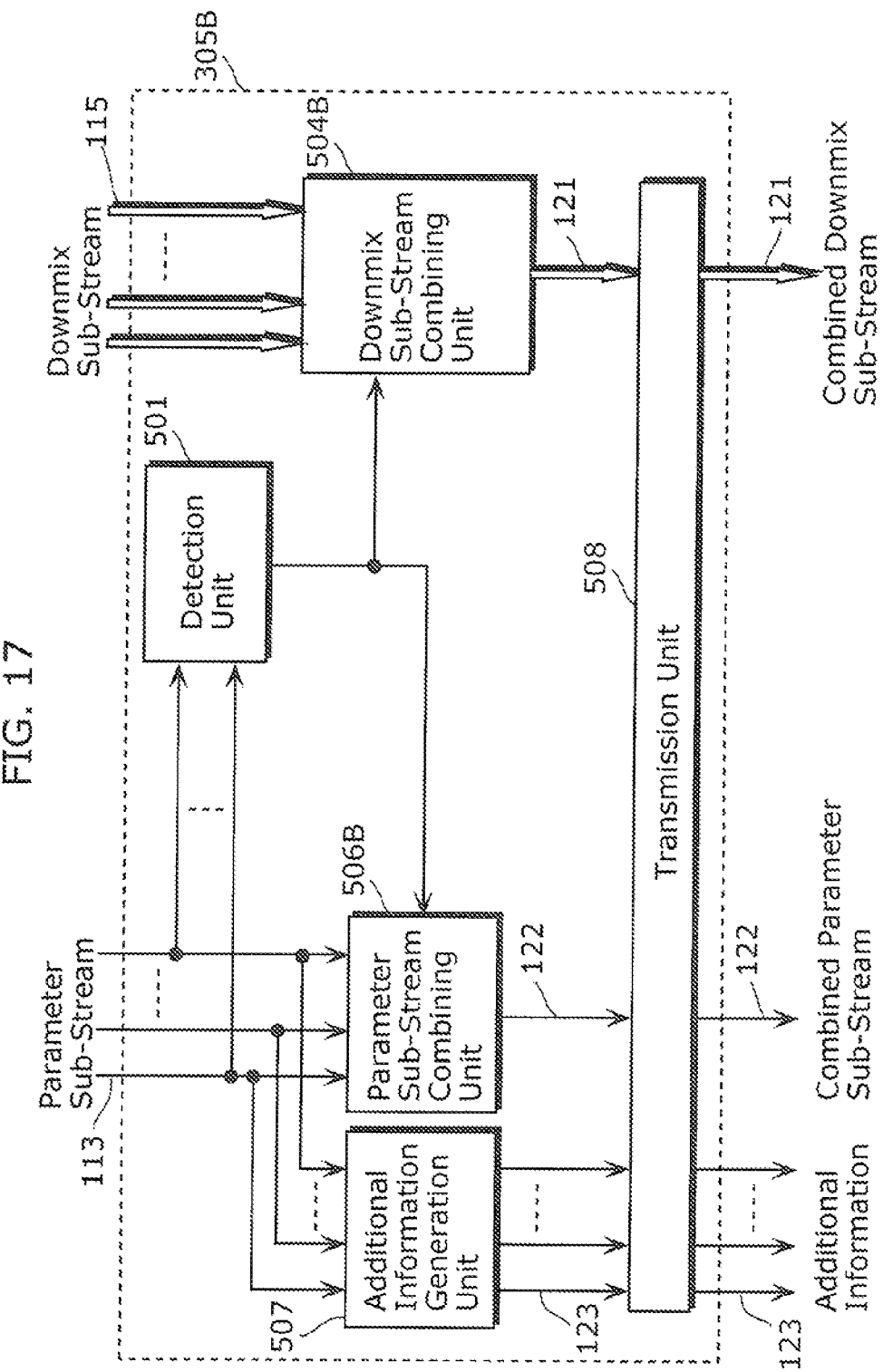
FIG. 17 is a block diagram of a MCU according to a second embodiment of the present invention.

FIG. 17 is a block diagram of a structure of the MCU 305B according to the second embodiment of the present invention.

The MCU 305B shown in FIG. 17 differs from the MCU 305A according to the first embodiment in processes of the downmix sub-stream combining unit and the parameter sub-stream combining unit. Namely, processes of a downmix sub-stream combining unit 504B and a parameter sub-stream combining unit 506B in the MCU 305B are different from the processes of the downmix sub-stream combining unit 504 and the parameter sub-stream combining unit 506 in the MCU 305A. However, the basic structures of the downmix sub-stream combining unit 504B and the parameter sub-stream combining unit 506B are the same as those of the downmix sub-stream combining unit 504 and the parameter sub-stream combining unit 506.

In addition, the MCU 305B differs from the MUC 305A in further including an additional information generation unit 507.

When there are two or more active sites, the downmix sub-stream combining unit 504B combines downmix sub-streams 115 received from all active sites to generate a single combined downmix sub-stream 121.

More specifically, after performing partial decoding processes for all active sites, the downmix sub-stream combining unit 504B combines all of the decoded MDCT coefficient sets 710 to a single combined MDCT coefficient set 712. Next, the downmix sub-stream combining unit 504B partially codes the combined MDCT coefficient set 712 to generate a single combined downmix sub-stream 121 to be distributed to all sites.

When there are two or more active sites, the parameter sub-stream combining unit 506B combines parameter sub-streams 113 received from all active sites to generate a single combined parameter sub-stream 122.

The additional information generation unit 507 generates plural pieces of additional information 123 each corresponding to one of the active sites. The additional information 123 is information for specifying signal components corresponding to a coded bitstream 116 received from the corresponding active site, from among signal components of the single combined downmix sub-stream 121 and the single combined parameter sub-stream 122. The additional information 123 will be described later.

The transmission unit 508 transmits the single combined downmix sub-stream 121 and the single combined parameter sub-stream 122 to each of the sites 301. In addition, the transmission unit 508 transmits each of the plural pieces of additional information 123 to a corresponding active site.

Figure 18:
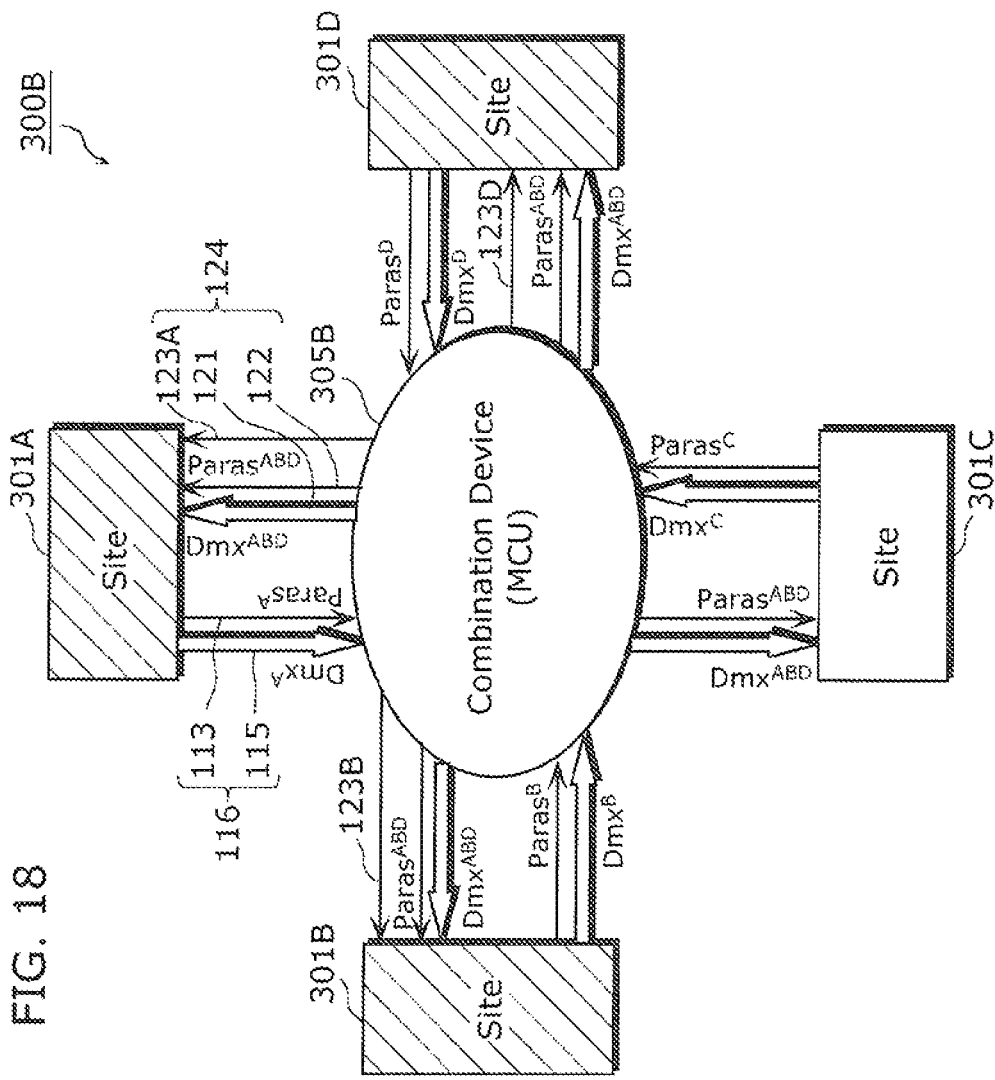
FIG. 18 is a diagram showing a process performed by the MCU according to the second embodiment of the present invention.

FIG. 18 is a diagram schematically showing a process performed by the MCU 305B when three sites 301A, 301B, and 301D are active among the four sites 301 in a telecommunication system 300B according to the second embodiment of the present invention. As shown in FIG. 18, when the sites 301A, 301B, and 301D are active, the MCU 305B combines the downmix sub-stream $Dmx^A$, the parameter sub-stream $Paras^A$, the downmix sub-stream $Dmx^B$, the parameter sub-stream $Paras^B$, the downmix sub-stream $Dmx^D$, and the parameter sub-stream $Paras^D$ to generate a combined downmix sub-stream $Dmx^{ABD}$ and a combined parameter sub-stream $Paras^{ABD}$. Then, the MCU 305B transmits the combined downmix sub-stream $Dmx^{ABD}$ and the combined parameter sub-stream $Paras^{ABD}$ to each of the sites 301A to 301D.

In addition, the MCU 305B transmits additional information 123A to the active site 301A, additional information 123B to the active site 301B, and additional information 123D to the active site 301D. Here, the pieces of additional information 123A, 1236, and 123D correspond to the sites 301A, 301B, and 301D, respectively.

Figure 19:
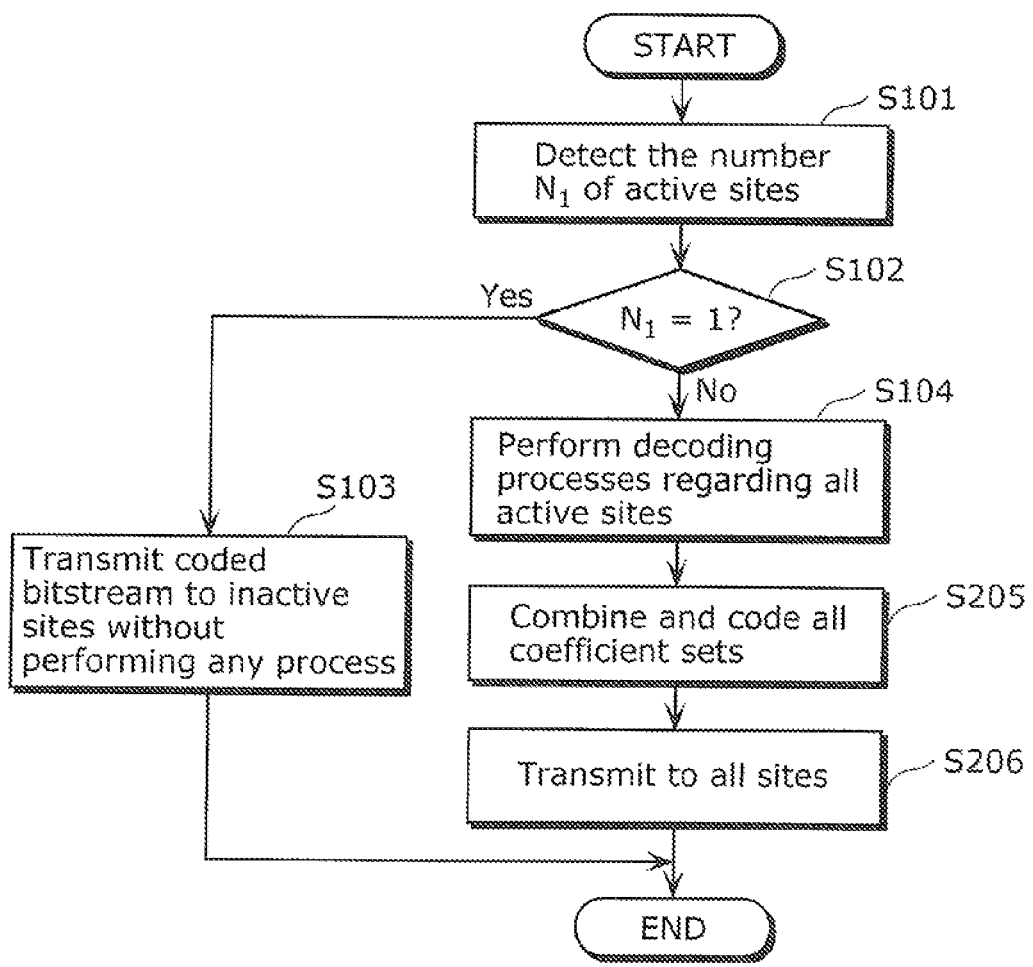
FIG. 19 is a flowchart of a combining process performed by the MCU according to the second embodiment of the present invention.

FIG. 19 is a flowchart of a combining process performed by the MCU 305B according to the second embodiment of the present invention. FIG. 20 is a table showing the complexity of the MCU 305A according to the first embodiment, the complexity of the MCU 305B according to the second embodiment, and the complexity of the general MCU.

It should be noted that Steps S101 to S104 in FIG. 19 are the same as those in FIG. 13, so that the steps are not explained again below.

After Step S104, the downmix sub-stream combining unit 504B combines and scales MDCT coefficient sets 710 of all active sites to generate a combined MDCT coefficient set 712. Then, the downmix sub-stream combining unit 504B codes and quantizes the generated combined MDCT coefficient set 712 to generate a single combined downmix sub-stream 121. The parameter sub-stream combining unit 506B combines parameter sub-streams 113 received from all active sites to generate a single combined parameter sub-stream 122 (S205).

Next, the transmission unit 508 transmits the single combined downmix sub-stream 121 and the single combined parameter sub-stream 122 generated at Step S205 to each of the sites (S206).

As described above, if the number N, of active sites is two or more (No at S102), the number of partial decoding processes is equal to the number $N_1$ of active sites, and each of the number of combining processes and the number of partial coding processes is one, as shown in FIG. 20. In other words, the partial decoding processes for the inactive sites are eliminated, and each of the number of combining processes and the number of partial coding processes is decreased to be 1.

To illustrate the effects of the second embodiment of the present invention, recall the above 8-site teleconferencing application. In this case, by employing the MCU 305B according to the second embodiment, the complexity can be reduced below the 15% of the general MCU complexity.

The following describes the additional information 123.

A Recall that, as stated before in the first embodiment, the object of the MCU 305B is, for each site, to combine coded bitstreams 116 received from all sites except a site as a transmission destination, into a single combined bitstream 124. Thus, when the combined bitstream 124 combines all coded bitstreams 116 as described in the second embodiment, there is a need to remove the interfering stream (components of a coded bitstream 116 transmitted by the site itself) in the combined bitstream 124 from its own site.

In the second embodiment of the present invention, the MCU 305B generates a common combined parameter sub-stream 122 including all pieces of parameter information. Each of the sites 301 mutes the interfering stream in the combined bitstream 124 in the parametric decoding process, by designing a common combined parameter sub-stream 122. Thereby, the telecommunication system 300B according to the second embodiment of the present invention achieves the removal of interfering stream in a parameter domain.

For example, consider the above 4-site teleconference system connecting the four sites 301, assuming there are three active sites 301A, 301B, and 301D. The common combined parameter sub-stream 122 can be constructed by the following steps.

(1) The number of objects (object number) is consolidated to the sum of the object number from the sites 301A, 301B, and 301D. That is, all object number included in the common combined parameter sub-stream 122 is expressed as $N_{total} = N_A + N_B + N_D$.

(2) Parameters to be combined are organized in the order of A, B, and D. For example, an object level difference is expressed as $OLD_i$ (l, m) where i=1, ... $N_A$, $N_A+1$, ..., $N_A+N_B$, $N_A+N_B+1$, ..., $N_{total}$.

The common combined parameter sub-stream 122, together with the common combined downmix sub-stream 121, is distributed to each receiving site. Then, the goal of the parametric decoding process at one receiving site, is to synthesize (namely, upmix) all audio input, except the interfering stream from its own site.

For the parametric audio decoding, the goal can be achieved by designing a customized rendering matrix. In detail, in order to remove the interfering objects from its own site, some new information should be created at the MCU 305B and send to the receiving site. The additional information 123 is the indices of the interfering objects, for example. With the additional information 123, zero gains can be set for the interfering objects in a rendering matrix of the parametric audio coding. As a result, ideally, the interfering objects can be muted.

More specifically, for each of active sites, the additional information generation unit 507 generates a piece of additional information 123 to be used to specify a parameter corresponding to the parameter sub-stream 113 transmitted from the active site, from among parameters included in the single combined parameter sub-stream 122.

As an example, for the receiving site 301B, the additional information generation unit 507 transmits the object number ($N_B$) and its starting object index in the common combined parameter sub-stream 122 ($N_A+1$), to the site 301B as the additional information 123, together with the combined parameter sub-stream 122.

Figure 21:
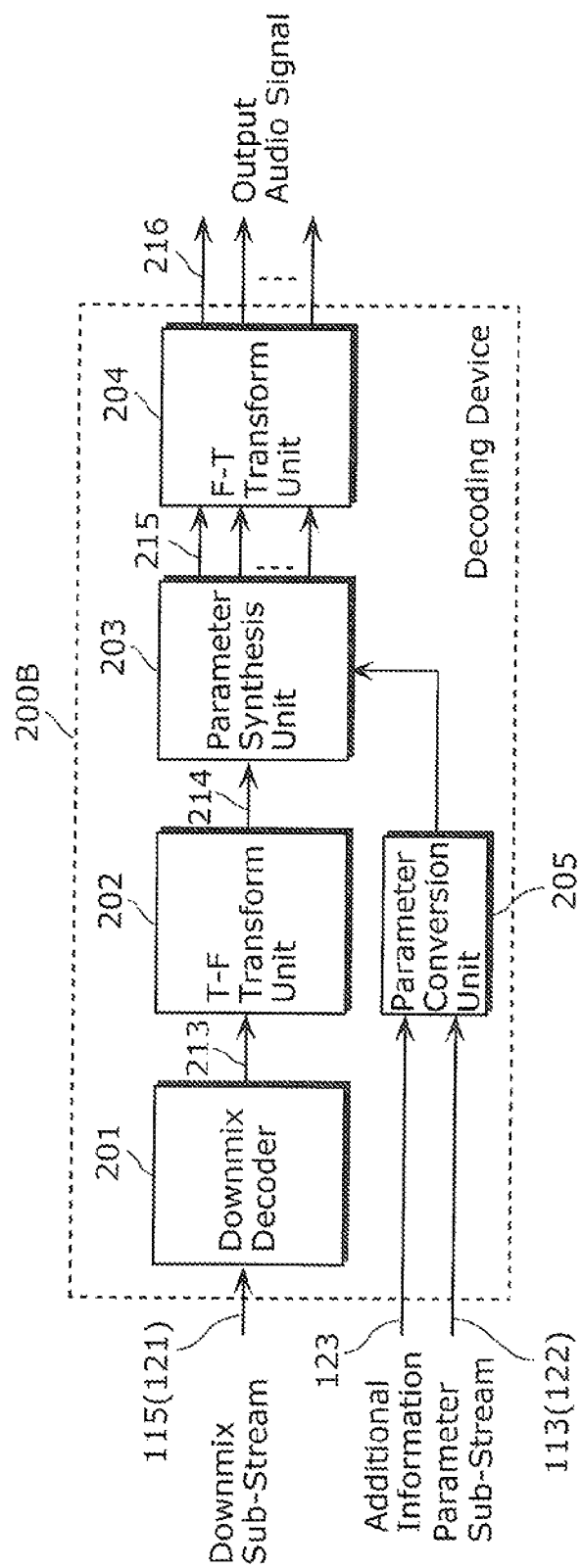
FIG. 21 is a block diagram of a parametric decoding device according to the second embodiment of the present invention.

FIG. 21 is a block diagram showing a structure of a parametric decoding device 200B in a site according to the second embodiment of the present invention. The elements in FIG. 21 which are identical to those in FIG. 2 are assigned with the same numeral references, and are not explained again below. The decoding device 200B shown in FIG. 21 differs from the decoding device 200 shown in FIG. 2 in including a parameter conversion unit 205.

Based on the additional information 123, the decoding device 200B generates a plurality of output audio signals 216 from which signal components corresponding to the coded bitstream 116 transmitted from the site 301 having the decoding device 200 are removed from signal components in the single combined bitstream 124.

More specifically, the parameter conversion unit 205 sets, using the additional information 123, matrix elements from a column $N_A+1$ to a column $N_A+N_B$ as zero in a drawing matrix having an arbitrarily designed rendering matrix with size of $N_{speaker} \times N_{total}$ (where $N_{speaker}$ representing the number of speakers on the site 301B) for following parametric decoding processes. This means that all objects from $N_A+1$ to $N_A+N_B$ has zero gain at all $N_{speaker}$ loudspeakers. As a result, the interfering objects for the site 301B are muted, and the remaining audio objects from the other sites are reproduced as desired.

As described above, the MCU 305B according to the second embodiment generates only a single combined downmix sub-stream 121 and a combined parameter sub-stream 122 to reduce complexity.

Furthermore, the MCU 305B according to the second embodiment generates additional information 123 for each active site. Thereby, each of the sites 301 can remove, from the single combined downmix sub-stream 121, signal components of a coded bitstream 116 transmitted by the site itself.

(Third Embodiment)

For parameter combination, note that in practice, it is possible for parameter sub-streams 113 from different sites have different parameter presentation basis, because of different bit rate availability and presented object characteristics for each of the sites 301. In the third embodiment of the present invention, the MCU 305C has the capability to support the parameter combination represented by different parameter presentation bases.

Here, a parameter presentation basis is a method of dividing a parameter tile into pieces (divided interval), for instance.

In the following example, it is assumed that two parameter sub-streams 113, such as a parameter sub-stream $\text{Paras}^B$ from the site 301B and a parameter sub-stream $\text{Paras}^C$ from the site 301C, are provided to the MCU 305. Here, the parameter sub-stream $\text{Paras}^B$ is represented in total $(P_1 \times Q_1)$ parameter tiles for $N_1$ objects, and the parameter sub-stream $\text{Paras}^C$ in total $(P_2 \times Q_2)$ parameter tiles for $N_2$ objects.

Here, in general, the following formula 13 is established.

[Mathematical Expression 13]

$$P_1 \neq P_2 \text{ and } Q_1 \neq Q_2 \quad \text{(Formula 13)}$$

Figure 22B:
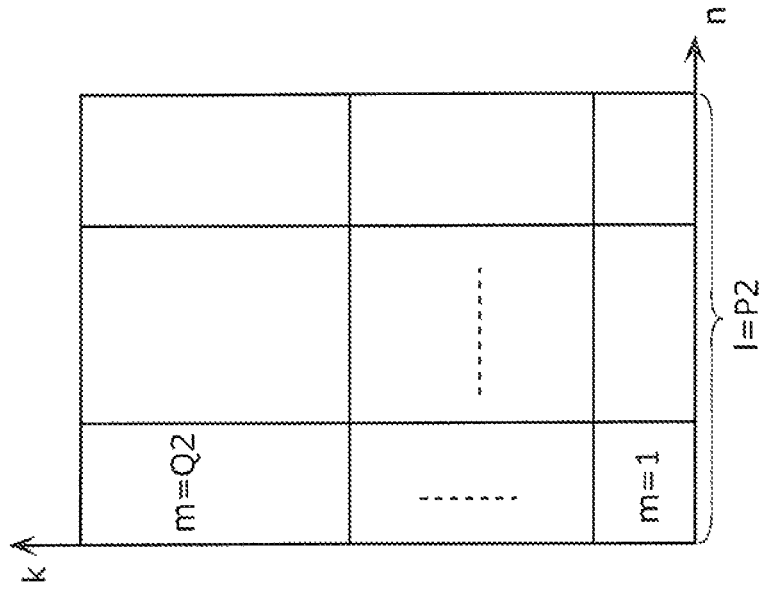
FIG. 22B is a graph plotting another example of a parameter basis according to the second embodiment of the present invention.
Figure 22A:
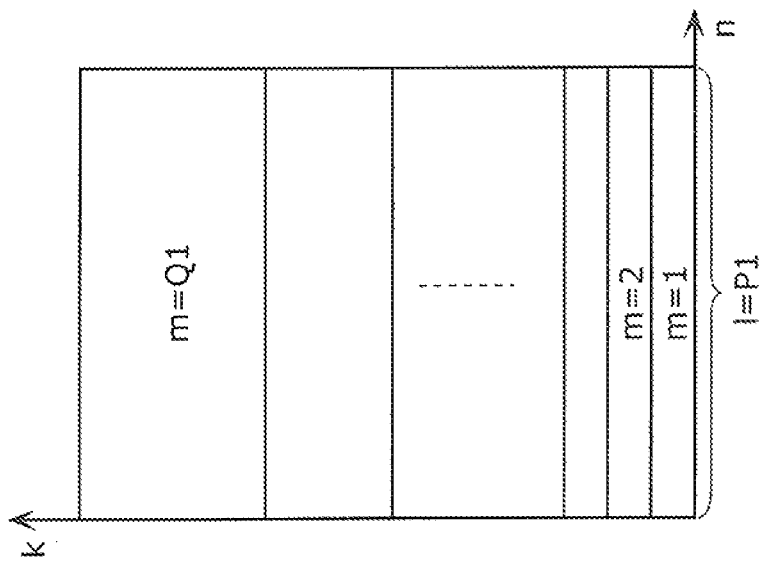
FIG. 22A is a graph plotting an example of a parameter basis according to the second embodiment of the present invention.

This is because of different signal characteristics and bit rate availability at the two individual coding sites. Without loss of generality, herein, as shown in FIGS. 22A and 22B, it is assumed that the following formula 14 is established.

[Mathematical Expression 14]

$$P_1 < P_2 \text{ and } Q_1 > Q_2 \quad \text{(Formula 14)}$$

Figure 23:
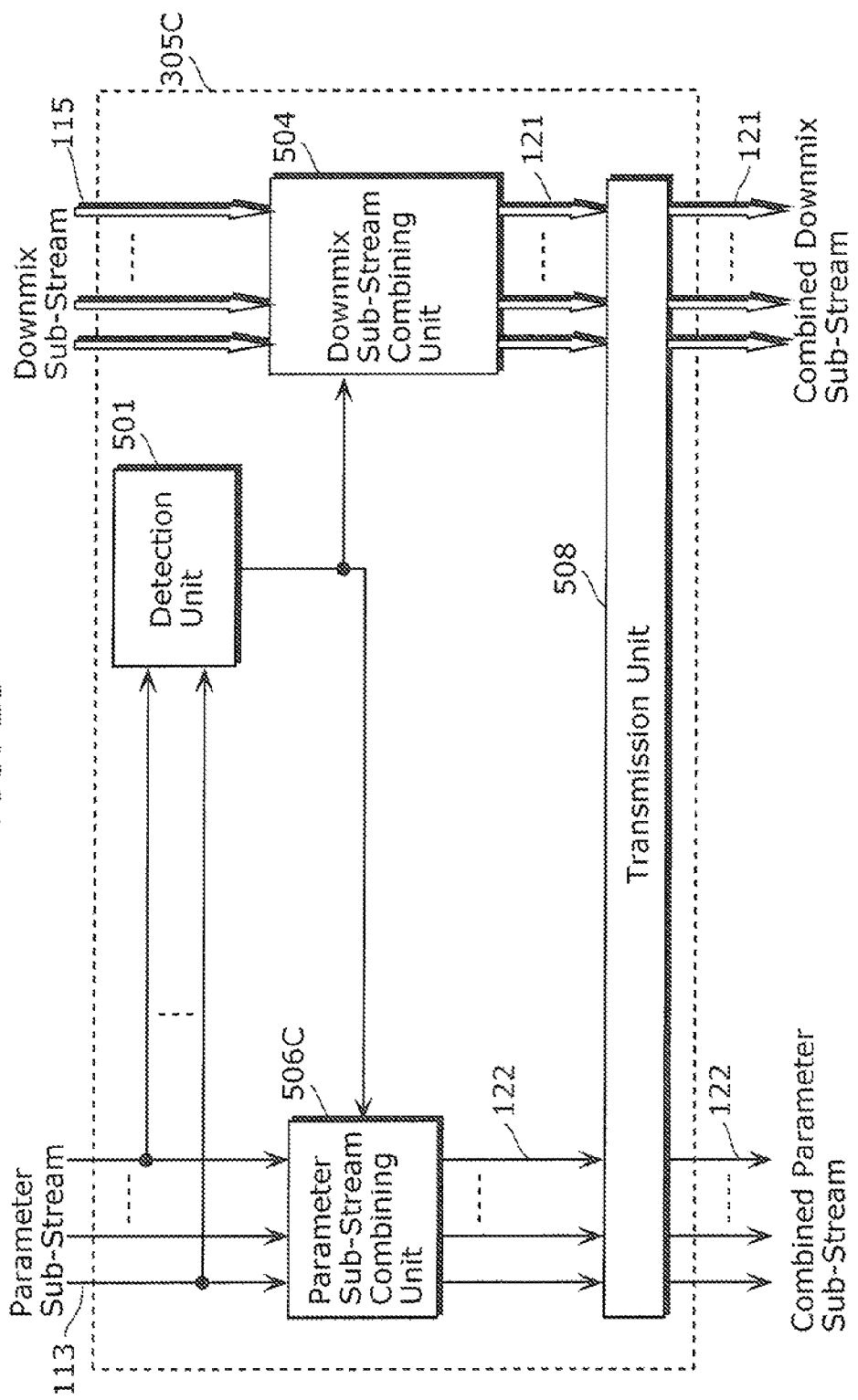
FIG. 23 is a block diagram of a MCU according to a third embodiment of the present invention.

FIG. 23 is a block diagram showing a structure of the MCU 305C according to the third embodiment of the present invention. The elements in FIG. 23 which are identical to those in FIG. 8 are assigned with the same numeral references, and are not explained again below.

In the MCU 305C shown in FIG. 23, a structure of a parameter sub-stream combining unit 506C is different from the structure of the parameter sub-stream combining unit 506 shown in FIG. 8.

FIG. 24 is a block diagram showing a structure of the parameter sub-stream combining unit 506C according to the third embodiment of the present invention. The elements in FIG. 24 which are identical to those in FIG. 11 are assigned with the same numeral references, and are not explained again below. FIG. 24 shows an example of combining the above parameter sub-streams $\text{Paras}^B$ and $\text{Paras}^C$.

The parameter sub-stream combining unit 506C shown in FIG. 24 differs from the parameter sub-stream combining unit shown in FIG. 11 in further including a parameter basis unifying unit 754.

When a plurality of parameter sub-streams 113 to be combined together are expressed by different parameter presentation bases, the parameter basis unifying unit 754 converts the parameter presentation bases of a plurality of parameters 761 into a single unified parameter presentation basis. Based on the single unified parameter presentation basis, the parameter basis unifying unit 754 generates a plurality of unified parameters 762.

The parameter combining unit 755 combines all of the unified parameters 762 to generate a combined parameter 763.

In the third embodiment of the present invention, the combination process for streams with such a hybrid parameter presentation basis is designed following the two principles:
(1) to capture the transient behavior as much as possible.
(2) to keep reasonable bit rate consumption for the combined parameter sub-stream 122 in order not to jeopardize the downmix signal quality.

In order to explore the second principle, it is necessary to derive an approximate estimation of bit consumption for a parameter sub-stream 113. Let's consider the $\text{Paras}^B$ with parameter representations for $N_1$ objects. In this case, there are $(N_1 \times P_1 \times Q_1)$ OLDs, $(P_1 \times Q_1)$ NRGs, $(N_1 \times (N_1-1) \times P_1 \times Q_1/$ 2) IOCs and $(N_1 \times P_1 \times Q_1)$ DMGs. Assume that no matter the parameter type is, the same bit cost is applied on the parameter. As a result, by ignoring the header information, the total bit consumption $\text{bit\_count}_1$ for the $\text{Paras}^B$ can be approximated by the following formula 15.

[Mathematical Expression 15]

$$\text{bit\_count}_1 \approx (P_1 * Q_1) * \left(N_1 + 1 + \frac{N_1 * (N_1 - 1)}{2} + N_1\right) \quad \text{(Formula 15)}$$
$$= (P_1 * Q_1) * (N_1 + 1) * \left(\frac{N_1}{2} + 1\right)$$

So the total bit consumption $\text{bit\_count}_{orig}$ for hybrid parameter presentation bases is expressed by the following formula 16.

[Mathematical Expression 16]

$$\text{bit\_count}_{orig} = \sum_{i=1}^{2} (N_i + 1)\left(\frac{N_i}{2} + 1\right)(P_i * Q_i) \quad \text{(Formula 16)}$$

Following the same way, three possible bit costs are calculated for all parameters represented with different configurations by the following formulas 17 to 19.

(1) Maximum bit consumption (for fine parameter presentation basis)

[Mathematical Expression 17]

$$\text{bit\_count}_{max} = (P_2 * Q_1)\sum_{i=1}^{2} (N_i + 1)\left(\frac{N_i}{2} + 1\right) \quad \text{(Formula 17)}$$

(2) Intermediate bit consumption (for parameter presentation basis keeping fine parameter set division only)

[Mathematical Expression 18]

$$\text{bit\_count}_I = \frac{Q_2}{Q_1} * \text{bit\_count}_{max} \quad \text{(Formula 18)}$$

(3) Minimum bit consumption (for coarse parameter presentation basis)

[Mathematical Expression 19]

$$\text{bit\_count}_{min} = \frac{P_1 * Q_2}{P_2 * Q_1} * \text{bit\_count}_{max} \quad \text{(Formula 19)}$$

Based on the above, to unify the different parameter presentation bases, three unifying methods are proposed with intelligent switch between them.

The parameter basis unifying unit 754 can adopt a fine parameter presentation basis, called the first unifying method, to unify (consolidate) the parameter sub-streams with hybrid parameter presentation bases. The fine parameter presentation basis has fine parameter band $Q_1$ from parameter bands $Q_1$ and $Q_2$ and a fine parameter band $P_2$ from parameter bands $P_1$ and $P_2$.

For the above example, the parameter basis unifying unit 754 adopts a fine basis with ($P_2 \times Q_1$) tiles as the unified basis, as shown in FIG. 25A.

The parameter basis unifying unit 754 can adopt the intermediate parameter presentation basis, called the second unifying method, to unify (consolidate) parameter sub-streams with hybrid parameter presentation bases. The intermediate parameter presentation basis has a coarse parameter band $Q_2$ from parameter bands $Q_1$ and $Q_2$ and a fine parameter band $P_2$ from parameter bands $P_1$ and $P_2$.

For the above example, the parameter basis unifying unit 754 adopts the intermediate basis with ($P_2 \times Q_2$) tiles as the unified basis as shown in FIG. 25B.

The parameter basis unifying unit 754 adopts the coarse parameter presentation basis, called the second unifying method, to unify (consolidate) parameter sub-streams with hybrid parameter presentation bases. The coarse parameter presentation basis has a coarse parameter band $Q_2$ from parameter bands $Q_1$ and $Q_2$ and a coarse parameter band $P_1$ from parameter bands $P_1$ and $P_2$.

For the above example, the parameter basis unifying unit 754 adopts the coarse basis with ($P_1 \times Q_2$) tiles as the unified basis as shown in FIG. 25C.

Naturally, for any of original parameter basis that is different from the unified one, the parameter basis unifying unit 754 needs to extend or shrink the parameters to the unified basis first.

Figure 26A:
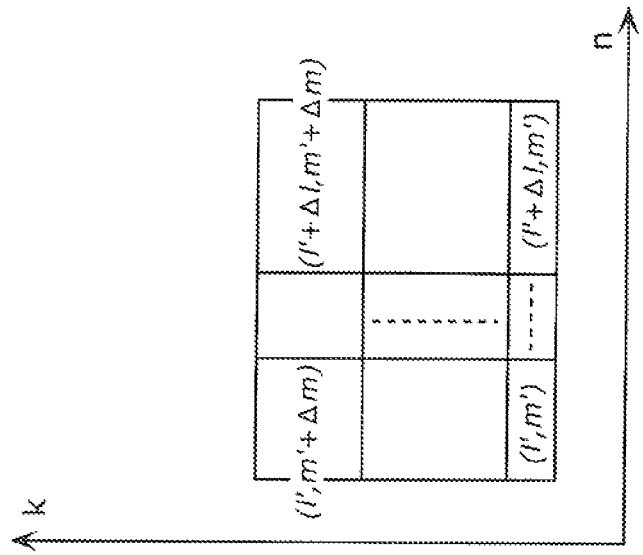
FIG. 26A is a graph plotting a parameter basis according to the third embodiment of the present invention.
Figure 26B:
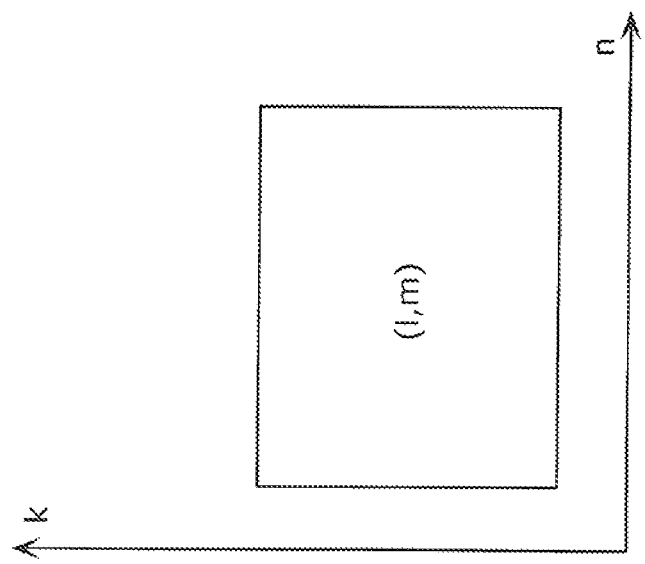
FIG. 26B is a graph plotting a parameter basis according to the third embodiment of the present invention.

For parameter extension, the parameter basis unifying unit 754 refines an old big parameter tile basis to a new small tile basis, i.e., from FIG. 26A to FIG. 26B. If an old tile (l, m) covers new small tiles from (l', m') to (l'+Δl, m'+Δm), parameters defined in the old tile are duplicated to the new tiles. For example, the parameter basis unifying unit 754 calculates a new OLD parameter using the following formula 20.

[Mathematical Expression 20]

$$OLD_i^{new}(u, v) = OLD_i^{old}(l, m) \text{ Where } l' \leq u \leq l'+\Delta l \text{ and } m' \leq v \leq m'+\Delta m \quad \text{(Formula 20)}$$

where i represents an object index.

Parameters with other parameter types, like IOC, NRG, and DMG, can be refined similarly.

On the contrary, for parameter shrinkage, the parameter representation is averaged from a plurality of old small tiles to a new big tile, i.e., from FIG. 26B to FIG. 26A. In this case, different parameter types have different averaging methods.

For example, the parameter basis unifying unit 754 calculates a new NRG parameter on a tile (l, m) by using the following formula 21.

[Mathematical Expression 21]

$$NRG^{new}(l, m) = \sum_{v=m'}^{m'+\Delta m} \sum_{u=l'}^{l'+\Delta l} NRG^{old}(u, v) \quad \text{(Formula 21)}$$

Based on it, the parameter basis unifying unit 754 can calculate the new OLD parameter by using the following formula 22.

[Mathematical Expression 22]

$$OLD_i^{new}(l, m) = \frac{\sum_{v=m'}^{m'+\Delta m} \sum_{u=l'}^{l'+\Delta l} OLD_i^{old}(u, v) * NRG^{old}(u, v)}{NRG^{new}(l, m)} \quad \text{(Formula 22)}$$

The parameter basis unifying unit 754 can calculate the new IOC parameter by using the following formula 23.

[Mathematical Expression 23]

$$IOC_{i,j}^{new}(l, m) = \frac{\sum_{v=m'}^{m'+\Delta m} \sum_{u=l'}^{l'+\Delta l} IOC_{i,j}^{old}(u, v) * \sqrt{\frac{OLD_i^{old}(u, v) *}{OLD_j^{old}(u, v)}} * NRG^{old}(u, v)}{\sqrt{\frac{OLD_i^{new}(l, m) *}{OLD_j^{new}(l, m)}} * NRG^{new}(l, m)} \quad \text{(Formula 23)}$$

The parameter basis unifying unit 754 can calculate the new DMG parameter by using the following formula 24 or 25.

[Mathematical Expression 24]

$$DMG_i^{new}(l, m) = 20\log_{10}\left(\frac{\sum_{v=m'}^{m'+\Delta m} \sum_{u=l'}^{l'+\Delta l} d_i^{old}(u, v)}{\Delta m * \Delta l} + \varepsilon\right) \quad \text{(Formula 24)}$$

Or, when weighted average is used, the parameter basis unifying unit 754 can calculate the new DMG parameter by using the following formula 25.

[Mathematical Expression 25]

$$DMG_i^{new}(l, m) = 20\log_{10}\left(\frac{\sum_{v=m'}^{m'+\Delta m} \sum_{u=l'}^{l'+\Delta l} d_i^{old}(u, v) * S(u, v)}{\sum_{v=m'}^{m'+\Delta m} \sum_{u=l'}^{l'+\Delta l} S(u, v)} + \varepsilon\right) \quad \text{(Formula 25)}$$

where S (u, v) represents the area of tile (u, v).

As described above, the MCU 305C according to the third embodiment of the present invention can combine parameters expressed by different bases.

(Fourth Embodiment)

In the fourth embodiment of the present invention, a variation of the MCU 305C according to the third embodiment is described. The variation, a MCU 305D, according to the fourth embodiment of the present invention has the ability to interactively switch the unified parameter presentation basis to another.

Figure 27:
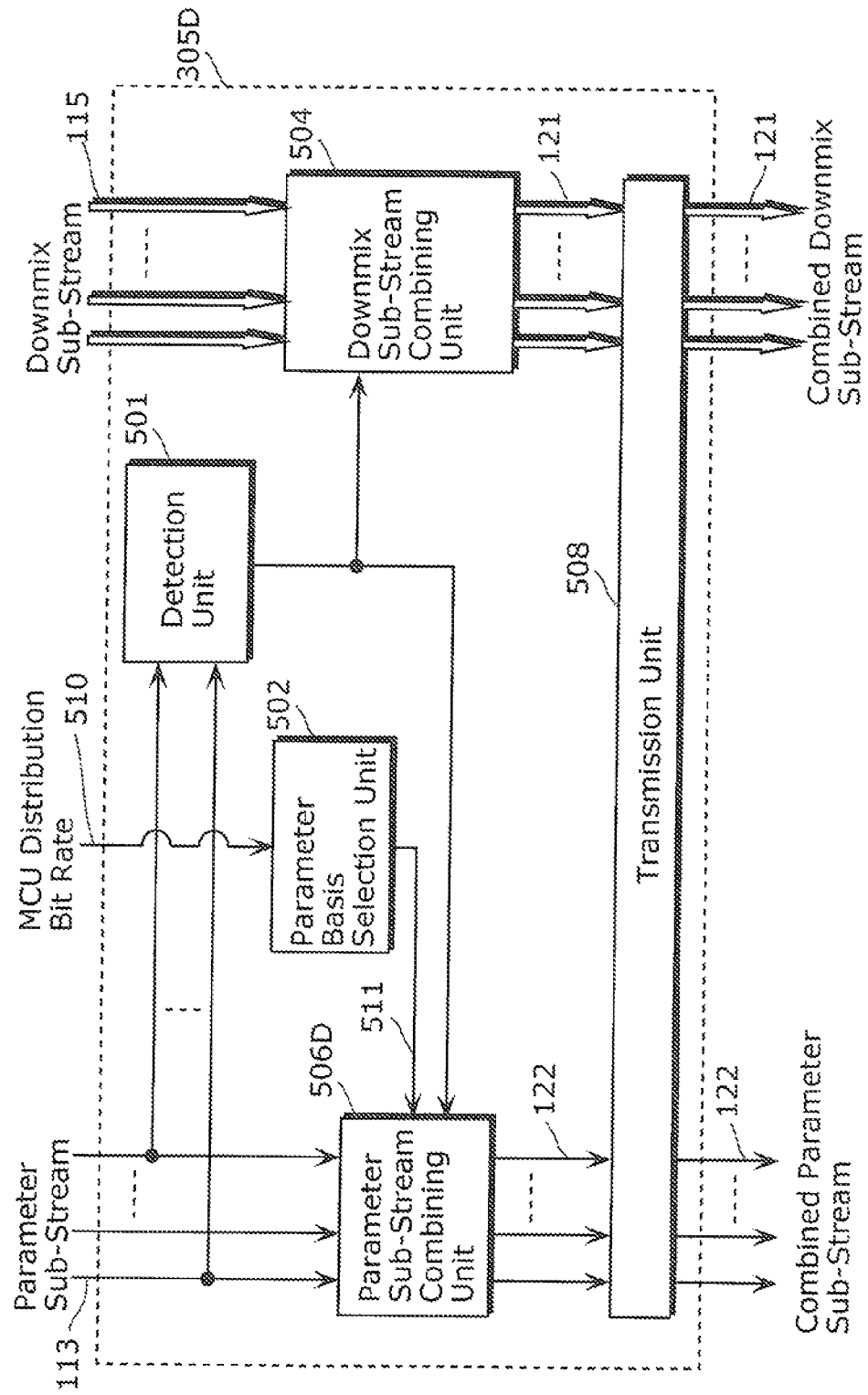
FIG. 27 is a block diagram of a MCU according to a fourth embodiment of the present invention.

FIG. 27 is a block diagram showing a structure of the MCU 305D according to the fourth embodiment of the present invention. Here, the elements in FIG. 27 which are identical to those in FIG. 23 are assigned with the same numeral references and are not explained again below.

The MCU 305D shown in FIG. 27 differs from the MCU shown in FIG. 23 in further including a parameter basis selection unit 502. In addition, a structure of a parameter sub-stream combining unit 506D in the MCU 305D is different from the structure of the parameter sub-stream combining unit 506C shown in FIG. 23.

The parameter basis selection unit 502 selects one of a plurality of parameter presentation bases, and provides a selection signal 511 indicating the selected parameter presentation basis to the parameter sub-stream combining unit 506. For example, the parameter basis selection unit 502 selects one of the three parameter presentation bases shown in FIGS. 25A to 25C (the fine parameter presentation basis, the intermediate parameter presentation basis, and the coarse parameter presentation basis).

More specifically, the parameter basis selection unit 502 can decide the mechanism for the basis switching, based on an actual bit rate 501 available for transmission from the MCU 305D to the plurality of sites 301, or based on a bit cost of the associated combined parameter sub-stream 122. It can be realized by the following three steps.

(1) At first, if a high bit rate is allowable for the MCU 305D distributing the combined streams to receiving sites, or the maximum bit consumption is reasonable, the parameter basis selection unit 502 selects the fine parameter presentation basis. This is expressed by the following formula 26.

[Mathematical Expression 26]

$$br \geq b_0 \text{ or } \frac{\text{bit\_count}_{max}}{\text{bit\_count}_{orig}} \leq c \text{ and } br > b_1 \quad \text{(Formula 26)}$$

where br represents an actual MCU distribution bit rate, $b_0$ represents a high bit rate predetermined for combined stream distribution, $b_1$ represents a predetermined low bit rate value, c represents a predetermined threshold value which is, for example, a real number between 1.5 to 2.0.

(2) If the above conditions are not satisfied, the parameter basis selection unit 502 tests whether the allowable bit rate condition for MCU distribution is very harsh, and the intermediate bit consumption is reasonable. More specifically, the parameter basis selection unit 502 determines whether or not the following formula 27 is satisfied.

[Mathematical Expression 27]

$$br > b_1 \text{ and } \frac{\text{bit\_count}_I}{\text{bit\_count}_{orig}} \leq c \quad \text{(Formula 27)}$$

When the above conditions are satisfied, the parameter basis selection unit 502 selects the intermediate parameter presentation basis.

(3) If none of the above conditions is satisfied, the parameter basis selection unit 502 selects the coarse parameter presentation basis as a unified parameter presentation basis.

It should be noted that the parameter basis selection unit 502 may select a parameter presentation basis based on both a bit rate and a bit cost, or based on only one of a bit rate and a bit cost.

Figure 28:
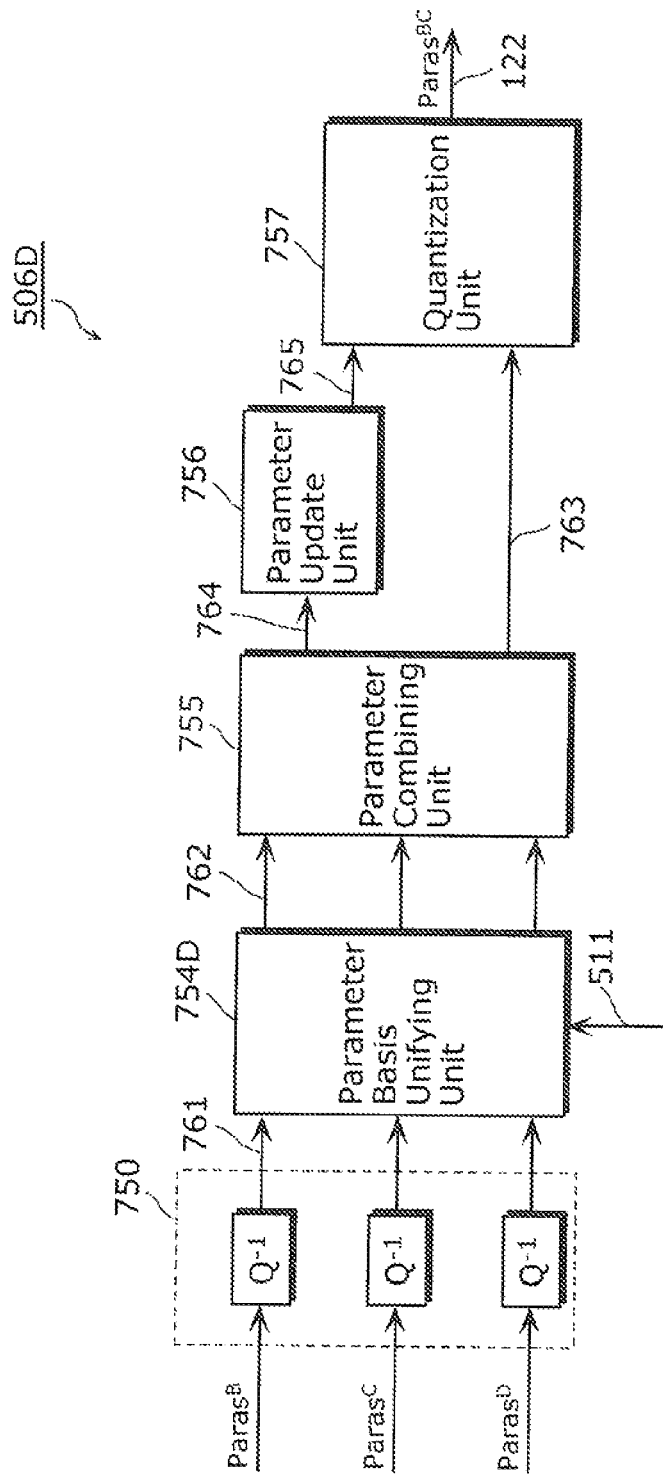
FIG. 28 is a block diagram of a parameter sub-stream combining unit according to the fourth embodiment of the present invention.

FIG. 28 is a diagram showing a structure of the parameter sub-stream combining unit 506D. The elements in FIG. 28 which are identical to those in FIG. 24 are assigned with the same numeral references and are not explained again below. In the 4-site teleconference system connecting the four sites, the three sites 301A, 301B, and 301D are assumed to be active. FIG. 28 shows only a structure for generating a single combined parameter sub-stream to be transmitted to the site 301A.

In the parameter sub-stream combining unit 506D shown in FIG. 28, a structure of a parameter basis unifying unit 754D is different form the structure of the parameter basis unifying unit 754 shown in FIG. 24.

The parameter basis unifying unit 754D converts a plurality of parameters 761 into a unified parameter 762 based on the parameter presentation basis indicated by the selection signal 511.

As described above, the MCU 305D according to the fourth embodiment can efficiently unify parameter sub-streams 113 having different parameter presentation bases, by considering a bit rate or a bit cost.

Thus, although the embodiments of the combination device and the telecommunication system of the present invention have been described above, the present invention is not limited to these embodiments.

Figure 4:
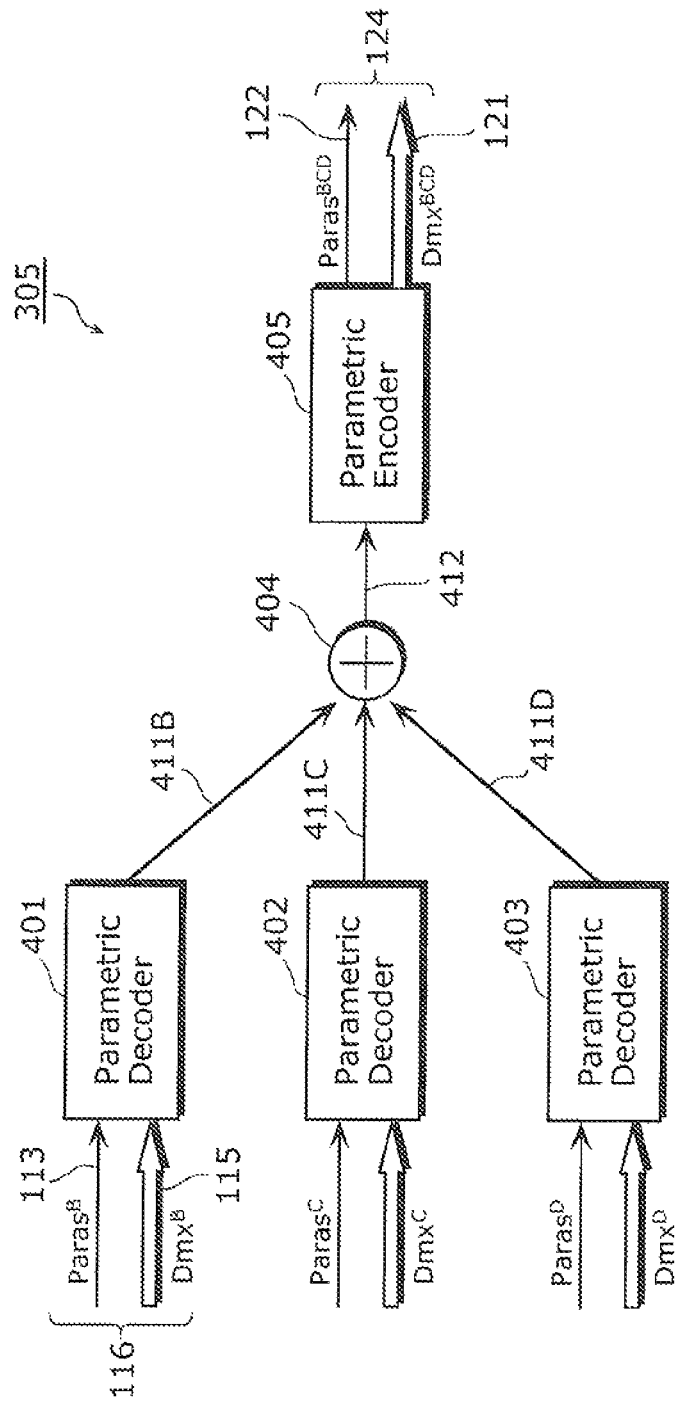
FIG. 4 is a block diagram of a conventional MCU.

For example, it has been described in the first to fourth embodiments that the downmix sub-stream combining unit 504 or 504B combines a plurality of downmix sub-streams 115 in a MDCT domain (spectrum domain), but the plurality of downmix sub-streams 115 may be combined in a time domain in the same manner as disclosed in the conventional example shown in FIG. 4.

The processing units (elements) included in the combination device, the coding device, and the decoding device according to the first to fourth embodiments are typically implemented into a Large Scale Integration (LSI) which is an integrated circuit. These may be integrated separately, or a part or all of them may be integrated into a single chip.

The technique of integrated circuit is not limited to the LSI, and it may be implemented as a dedicated circuit or a general-purpose processor. It is also possible to use a Field Programmable Gate Array (FPGA) that can be programmed after manufacturing the LSI, or a reconfigurable processor in which connection and setting of circuit cells inside the LSI can be reconfigured.

A part or all of the functions of the combination device, the coding device, and the decoding device according to the first to fourth embodiments may be realized by executing a program using a processor such as a Central Processing Unit (CPU).

The prevent invention may be the above program, or a recording medium on which the program is recorded. Of course, the program may be distributed via a transmission medium such as the Internet.

At least a part of the functions of the telecommunication system, the combination device, the coding device, the decoding device according to the first to fourth embodiments and variation may be combined together.

The numbers used in the above description are examples for explaining the embodiments of the present invention in detail. The present invention is not limited to the example numbers.

The combining method used by the above-described combination device is an example for explaining the embodiments of the present invention in detail. The combining method used by the combination device according to the present invention is not limited to the above. For example, the order of executing the above-described steps is an example for explaining the embodiments of the present invention in detail, and the present invention may use other orders. A part of the steps may be executed at the same time (in parallel).

Furthermore, those skilled in the art will be readily appreciate that variations with modifications are possible in the embodiments without materially departing from the novel teachings and advantages of the present invention.

Industrial Applicability

The present invention can be used for combination devices. Moreover, the present invention can be used for teleconference systems using the combination devices.

Numerical References

| | |
|---|---|
| 100 | coding device |
| 101, 202 | T-F transform unit |
| 102 | analyzer |
| 102A | downmix unit |
| 102B | parameter extraction unit |
| 103, 204 | F-T transform unit |
| 104 | downmix encoder |
| 110 | input audio signal |
| 111 | frequency signal |
| 112 | intermediate downmix signal |
| 113, $Paras^A$, $Paras^B$, $Paras^C$, $Paras^D$ | parameter sub-stream |
| 114 | downmix time signal |
| 115, $Dmx^A$, $Dmx^B$, $Dmx^C$, $Dmx^D$ | downmix sub-stream |
| 116 | coded bitstream |
| 121, $Dmx^{ABC}$, $Dmx^{ABD}$, $Dmx^{ACD}$, $Dmx^{BCD}$, $Dmx^{AB}$, $Dmx^{AC}$, $Dmx^{BC}$ | combined downmix sub-stream |
| 122, $Paras^{ABC}$, $Paras^{ABD}$, $Paras^{ACD}$, $Paras^{BCD}$, $Paras^{AB}$, $Paras^{AC}$, $Paras^{BC}$ | combined parameter sub-stream |
| 123, 123A, 123B, 123D | additional information |
| 124 | combined bitstream |
| 200, 200B | decoding device |
| 201 | downmix decoder |
| 203 | parameter synthesis unit |
| 205 | parameter conversion unit |
| 213 | time signal |
| 214 | frequency signal |
| 215 | transformed signal |
| 216 | output audio signal |
| 300, 300A, 300B | telecommunication system |
| 301, 301A, 301B, 301C, 301D | site |
| 305, 305A, 305B, 305C, 305D | MCU |
| 401, 402, 403 | parametric decoder |
| 404, 704 | adder |
| 405 | parametric encoder |
| 411B, 411C, 411D | decoded signal |
| 412 | sum signal |
| 501 | detection unit |
| 502 | parameter basis selection unit |
| 504, 504B | downmix sub-stream combining unit |
| 506, 506B, 506C, 506D | parameter sub-stream combining unit |
| 507 | additional information generation unit |
| 508 | transmission unit |
| 510 | bit rate |
| 511 | selection signal |
| 601 | MDCT unit |
| 602 | coding unit |
| 603 | control unit |
| 611, 710, $coef^B$, $coef^C$, $coef^D$ | MDCT coefficient set |
| 700 | decoding unit |
| 701, 702, 703 | inverse coding unit |
| 705 | scaling unit |
| 706 | coding unit |
| 711, 712, $coef^{BCD}$ | combined MDCT coefficient set |
| 750 | inverse quantization unit |
| 754, 754D | parameter basis unifying unit |
| 755 | parameter combining unit |
| 756 | parameter update unit |
| 757 | quantization unit |
| 761 | parameter |
| 762 | unified parameter |
| 763, 764 | combined parameter |
| 765 | updated parameter |

The invention claimed is:

1. A combination device that combines a plurality of coded bitstreams transmitted from a plurality of sites, the plurality of coded bitstreams each including a downmix sub-stream and a parameter sub-stream, the downmix sub-stream being generated by down-mixing a plurality of input audio signals and having a total number of signals that is less than a total number of signals in the plurality of input audio signals, and the parameter sub-stream being to be used to decode the downmix sub-stream into the plurality of input audio signals which have the total number of signals that is more than the total number of signals in the downmix sub-stream, said combination device comprising:

a detection unit configured to detect an active coded bitstream from the plurality of coded bitstreams within a predetermined time period, the active coded bitstream being a coded bitstream that has a sound volume that is larger than a predetermined threshold value;

a first combining unit configured to combine, from among a plurality of downmix sub-streams, only plural downmix sub-streams included in plural active coded bitstreams, so as to generate a combined downmix sub-stream;

a second combining unit configured to combine, from among a plurality of parameter sub-streams, only plural parameter sub-streams included in the plural active coded bitstreams, so as to generate a combined parameter sub-stream; and a transmission unit configured to transmit, to the plurality of sites, a combined bit stream that includes the combined downmix sub-stream and the combined parameter sub-stream;

wherein said second combining unit includes a parameter basis unifying unit configured to convert different parameter presentation bases of the plural parameter sub-streams to a single unified parameter presentation basis, and generate plural unified parameters based on the single unified parameter presentation basis, when the plural parameter sub-streams are expressed by the different parameter presentation bases, and wherein said second combining unit is configured to combine the plural unified parameters so as to generate the combined parameter sub-stream.

2. The combination device according to claim 1, wherein said first combining unit includes:

a decoding unit configured to decode, from among the plurality of downmix sub-streams, only the plural downmix sub-streams included in the plural active coded bitstreams, so as to generate plural decoded downmix sub-streams;

an adding unit configured to add the plural decoded downmix sub-streams together so as to generate at least one intermediate combined downmix sub-stream; and a coding unit configured to code the at least one intermediate combined downmix sub-stream so as to generate at least one combined downmix sub-stream.

3. The combination device according to claim 1, wherein said first combining unit is configured to combine, for each of the plurality of sites, a set of downmix sub-streams transmitted from the plurality of sites so as to generate a combined downmix sub-stream to be transmitted to the site for which the set of downmix sub-streams is combined, the set of downmix sub-streams including the downmix sub-streams included in the plural active coded bitstreams transmitted from the plurality of sites other than the site for which the set of downmix sub-streams is combined, wherein said second combining unit is configured to combine, for each of the plurality of sites, a set of parameter sub-streams transmitted from the plurality of sites so as to generate a combined parameter sub-stream to be transmitted to the site for which the set of parameter sub-streams is combined, the set of parameter sub-streams including the parameter sub-streams included in the plural active coded bitstreams transmitted from the plurality of sites other than the site for which the set of parameter sub-streams is combined, wherein said transmission unit is configured to transmit, to each of the plurality of sites, a combined bitstream that includes (i) the combined downmix sub-stream which is generated for the site by the first combining unit and (ii) the combined parameter sub-stream which is generated for the site by the second combining unit, and wherein when a number of inactive coded bitstreams is two or more, the inactive coded bitstreams being coded bitstreams other than the plurality of active coded bitstreams in the plurality of coded bitstreams, (1) said first combining unit is configured to combine the plural downmix sub-streams included in all of the plural active coded bitstreams so as to generate a common combined downmix sub-stream, (2) said second combining unit is configured to combine the plural parameter sub-streams included all of the plural active coded bitstreams so as to generate a common combined parameter sub-stream, and (3) said transmission unit is configured to transmit a common combined bitstream that includes the common combined downmix sub-stream and the common combined parameter sub-stream, to sites which transmit the inactive coded bitstreams that are two or more.

4. The combination device according to claim 1, wherein, when a number of the plural active coded bitstreams is two, said transmission unit is configured to (i) transmit, without a combining process, a first coded bitstream that is one of the plural active coded bitstreams to a site transmitting a second coded bitstream that is other one of the plural active coded bitstreams, and to (ii) transmit the second coded bitstream to a site transmitting the first coded bitstream without a combining process.

5. The combination device according to claim 1, wherein, when a number of the plural active coded bitstreams is one, said transmission unit is configured to transmit, without a combining process, the active coded bitstream to the plurality of sites except a site transmitting the active coded bitstream.

6. The combination device according to claim 1, wherein said detection unit is configured to detect the active coded bitstream based on information included in each of the plurality of parameter sub-streams.

7. The combination device according to claim 1, wherein said first combining unit is configured to combine the plural downmix sub-streams included in all of the plural active coded bitstreams so as to generate a single combined downmix sub-stream, wherein said second combining unit is configured to combine the plural parameter sub-streams included in all of the plural active coded bitstreams so as to generate a single combined parameter sub-stream, and wherein said transmission unit is configured to transmit, to each of the plurality of sites, a single combined bitstream that includes the single combined downmix sub-stream and the single combined parameter sub-stream.

8. The combination device according to claim 7, further comprising an additional information generation unit configured to generate, for each of active sites which have transmitted the plural active coded bitstreams, additional information to be used to specify a signal component from signal components in the single combined bitstream, the signal component corresponding a corresponding one of the plural active coded bitstreams which has been transmitted from the each of active sites, wherein said transmission unit is configured to transmit the additional information to the each of active sites.

9. The combination device according to claim 8, wherein said additional information generation unit is configured to generate the additional information for each of the active sites, the additional information being to be used to specify a parameter from parameters included in the single combined parameter sub-stream, the parameter corresponding to a corresponding one of the plural parameter sub-streams which has been transmitted from the each of the active sites.

10. The combination device according to claim 1, further comprising a parameter basis selection unit configured to select the single unified parameter presentation basis from a plurality of parameter presentation bases, based on a current bit rate available for transmission from said combination device to the plurality of sites.

11. The combination device according to claim 1, further comprising a parameter basis selection unit configured to select the single unified parameter presentation basis from a plurality of parameter presentation bases, based on a bit cost indicating the number of bits of the combined parameter sub-stream.

12. The combination device according to claim 2, wherein each of the plural downmix sub-stream is generated by down-mixing the plurality of input audio signals, transformed into a spectrum domain, and coded, wherein said decoding unit is configured to decode the plural downmix sub-streams to generate the plural decoded downmix sub-streams in the spectrum domain, and wherein said adding unit is configured to add the plural decoded downmix sub-streams in the spectrum domain together so as to generate the at least one intermediate combined downmix sub-stream.

13. The combination device according to claim 12, wherein said first combining unit further includes a scaling unit configured to scale the at least one intermediate combined downmix sub-stream so that spectrum power of the plural decoded downmix sub-streams is preserved in the at least one intermediate combined downmix sub-stream, and wherein said coding unit is configured to code the at least one intermediate combined downmix sub-stream scaled by said scaling unit so as to generate the combined downmix sub-stream.

14. The combination device according to claim 12, wherein said second combining unit includes:

an inverse quantization unit configured to inversely quantize the plural parameter sub-streams so as to generate plural inversely-quantized parameters;

a parameter combining unit configured to combine the plural inversely-quantized parameters so as to generate a combined parameter;

a parameter update unit configured to update a part of parameters included in the combined parameter so as to generate a updated parameter; and a quantization unit configured to quantize (a) a parameter except the part of parameters included in the combined parameter and (b) the updated parameter so as to generate the combined parameter sub-stream.

15. A telecommunication system comprising:

a plurality of sites each including a coding device that generates a coded bitstream that includes a downmix sub-stream and a parameter sub-stream, the downmix sub-stream being generated by down-mixing a plurality of input audio signals, and the parameter sub-stream being to be used to reconstruct the plurality of input audio signals from the downmix sub-stream; and the combination device according to claim 1 which combines a plurality coded bitstreams including the coded bitstream which are transmitted from said plurality of sites so as to generate a combined bitstream, and transmits the combined bitstream to each of said plurality of sites, wherein each of said plurality of sites further includes a decoding device that decodes the combined bitstream to generate output audio signals.

16. A telecommunication system comprising:

a plurality of sites each including a coding device that generates a coded bitstream that includes a downmix sub-stream and a parameter sub-stream, the downmix sub-stream being generated by down-mixing a plurality of input audio signals, and the parameter sub-stream being to be used to reconstruct the plurality of input audio signals from the downmix sub-stream; and the combination device according to claim 8 which combines a plurality of coded bitstreams including the coded bitstream which are transmitted from said plurality of sites so as to generate a combined bitstream, and transmits the combined bitstream to each of said plurality of sites, wherein each of said plurality of sites further includes a decoding device that decodes the combined bitstream to generate output audio signals, and wherein said decoding device generates, based on the additional information, the output audio signals from which a signal component is removed from signal components in the single combined bitstream, the signal component corresponding to the coded bitstream transmitted from a corresponding one of said plurality of sites which includes said decoding device.

17. A combining method of combining a plurality of coded bitstreams transmitted from a plurality of sites, the plurality of coded bitstreams each including a downmix sub-stream and a parameter sub-stream, the downmix sub-stream being generated by downmixing a plurality of input audio signals and having a total number of signals that is less than a total number of signals in the plurality of input audio signals, and the parameter sub-stream being to be used to decode the downmix sub-stream into the plurality of input audio signals which have the total number of signals that is more than the total number of signals in the downmix sub-stream, said combining method comprising:

detecting an active coded bitstream from the plurality of coded bitstreams within a predetermined time period, the active coded bitstream being a coded bitstream that has a sound volume that is larger than a predetermined threshold value;

combining, from among a plurality of downmix sub-streams, only plural downmix sub-streams included in plural active coded bitstreams including the active bitstream, so as to generate a combined downmix sub-stream;

combining, from among a plurality of parameter sub-streams, only plural parameter sub-streams included in the plural active coded bitstreams, so as to generate a combined parameter sub-stream; and transmitting, to each of the plurality of sites, a combined bit stream that includes the combined downmix sub-stream and the combined parameter sub-stream, wherein said combining only the plural downmix sub-streams includes converting different parameter presentation bases of the plural parameter sub-streams to a single unified parameter presentation basis, and generating plural unified parameters based on the single unified parameter presentation basis, when the plural parameter sub-streams are expressed by the different parameter presentation bases, and wherein said combining only the plural downmix sub-streams combines the plural unified parameters so as to generate the combined parameter sub-stream.

18. A non-transitory computer-readable recording medium for use in a computer, the recording medium having a computer program recorded thereon for causing the computer to execute the combining method according to claim 17.

19. An integrated circuit that combines a plurality of coded bitstreams transmitted from a plurality of sites, the plurality of coded bitstreams each including a downmix sub-stream and a parameter sub-stream, the downmix sub-stream being generated by downmixing a plurality of input audio signals and having a total number of signals that is less than a total number of signals in the plurality of input audio signals, and the parameter sub-stream being to be used to decode the downmix sub-stream into the plurality of input audio signals which have the total number of signals that is more than the total number of signals in the downmix sub-stream, said integrated circuit comprising:

a detection unit configured to detect an active coded bit-stream from the plurality of coded bitstreams within a predetermined time period, the active coded bitstream being a coded bitstream that has a sound volume that is larger than a predetermined threshold value;

a first combining unit configured to combine, from among a plurality of downmix sub-streams, only plural downmix sub-streams included in plural active coded bit-streams including the active bitstream, so as to generate a combined downmix sub-stream;

a second combining unit configured to combine, from among a plurality of parameter sub-streams, only plural parameter sub-streams included in the plural active coded bitstreams, so as to generate a combined parameter sub-stream; and a transmission unit configured to transmit, to each of the plurality of sites, a combined bit stream that includes the combined downmix sub-stream and the combined parameter sub-stream, wherein said second combining unit includes a parameter basis unifying unit configured to convert different parameter presentation bases of the plural parameter sub-streams to a single unified parameter presentation basis, and generate plural unified parameters based on the single unified parameter presentation basis, when the plural parameter sub-streams are expressed by the different parameter presentation bases, and wherein said second combining unit is configured to combine the plural unified parameters so as to generate the combined parameter sub-stream.

20. The combination device according to claim 1, wherein each of the different parameter presentation bases is a pattern of dividing a parameter tile.

21. The combination device according to claim 1, wherein said parameter basis unifying unit is configured (i) to determine whether or not the plural parameter sub-streams are expressed by the different parameter presentation bases, and (ii) when the plural parameter sub-streams are expressed by the different parameter presentation bases, to convert the different parameter presentation bases of the plural parameter sub-streams into the single unified parameter presentation basis to unify the different parameter presentation bases.

* * * * *